United States Patent
Ratts et al.

(10) Patent No.: US 11,157,626 B1
(45) Date of Patent: Oct. 26, 2021

(54) BI-DIRECTIONAL CHAIN OF TRUST NETWORK

(71) Applicants: Steven D. Ratts, Melbourne, FL (US); Brian J. Noe, Indian Harbour Beach, FL (US); Francis B. Afinidad, Melbourne, FL (US)

(72) Inventors: Steven D. Ratts, Melbourne, FL (US); Brian J. Noe, Indian Harbour Beach, FL (US); Francis B. Afinidad, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 282 days.

(21) Appl. No.: 16/425,614

(22) Filed: May 29, 2019

(51) Int. Cl.
| | | |
|---|---|---|
| *G06F 21/00* | (2013.01) | |
| *G06F 21/57* | (2013.01) | |
| *G06F 21/51* | (2013.01) | |
| *G06F 21/64* | (2013.01) | |

(52) U.S. Cl.
CPC ............ *G06F 21/575* (2013.01); *G06F 21/51* (2013.01); *G06F 21/64* (2013.01); *G06F 2221/034* (2013.01)

(58) Field of Classification Search
CPC .. G06F 21/575; G06F 2221/034; G06F 21/64; G06F 21/51
See application file for complete search history.

(56) References Cited

U.S. PATENT DOCUMENTS

| | | |
|---|---|---|
| 3,636,318 A | 1/1972 | Lindstrom et al. |
| 4,993,068 A | 2/1991 | Piosenka et al. |
| 4,995,081 A | 2/1991 | Leighton et al. |
| | (Continued) | |

FOREIGN PATENT DOCUMENTS

WO   0140982   6/2001

OTHER PUBLICATIONS

Pavlidis, "A New Paper/Computer Interface: Two-Dimensional Symbologies". 15th International Conference on Pattern Recognition. vol. 2 Pub. Dated: 2000. Relevant pp. 145-151. Found on the World Wide Web at: http://ieeexplore.ieee.org/stamp/stamp/jsp?tp=&arnumber=906036.

(Continued)

*Primary Examiner* — Ghazal B Shehni
(74) *Attorney, Agent, or Firm* — Tarolli, Sundheim, Covell & Tummino LLP

(57) ABSTRACT

A system for establishing and maintaining a bi-directional chain of trust includes a root of trust (RoT) executing a root trusted server that can establish a trusted relationship between the RoT and a given node, and monitor the given node to ensure that the given node executes trusted operations and to ensure that authenticated code and static data for the given node are unchanged. The given node can include a trusted server that can monitor another node to ensure that the other node executes trusted operations and to ensure that authenticated code and static data for the other node are unchanged. The other node can include a trusted server that can monitor the given node to ensure that the given node executes trusted operations and to ensure that the authenticated code and static data for the given node are unchanged based on maintenance information received for the given node.

19 Claims, 5 Drawing Sheets

(56) References Cited

U.S. PATENT DOCUMENTS

| | | |
|---|---|---|
| 5,337,358 A | 8/1994 | Axelrod et al. |
| 5,337,360 A | 8/1994 | Fischer |
| 5,420,924 A | 5/1995 | Berson et al. |
| 5,436,972 A | 7/1995 | Fischer |
| 5,457,747 A | 10/1995 | Drexler et al. |
| 5,657,389 A | 8/1997 | Houvener |
| 5,659,616 A | 8/1997 | Sudia |
| 5,668,874 A | 9/1997 | Kristol et al. |
| 5,673,320 A | 9/1997 | Ray et al. |
| 5,712,914 A | 1/1998 | Aucsmith et al. |
| 5,742,685 A | 4/1998 | Berson et al. |
| 5,748,807 A | 5/1998 | Lopresti et al. |
| 5,764,789 A | 6/1998 | Pare, Jr. et al. |
| 5,774,552 A | 6/1998 | Grimmer |
| 5,787,186 A | 7/1998 | Schroeder |
| 5,790,674 A | 8/1998 | Houvener et al. |
| 5,799,092 A | 8/1998 | Kristol et al. |
| 5,805,719 A | 9/1998 | Pare, Jr. et al. |
| 5,838,812 A | 11/1998 | Pare, Jr. et al. |
| 5,864,622 A | 1/1999 | Marcus |
| 5,892,904 A | 4/1999 | Atkinson et al. |
| 5,973,731 A | 10/1999 | Schwab |
| 5,987,153 A | 11/1999 | Chan et al. |
| 6,016,476 A | 1/2000 | Maes et al. |
| 6,016,480 A | 1/2000 | Houvener et al. |
| 6,035,398 A | 3/2000 | Bjorn |
| 6,072,894 A | 6/2000 | Payne |
| 6,104,809 A | 8/2000 | Berson et al. |
| 6,122,403 A | 9/2000 | Rhoads |
| 6,137,895 A | 10/2000 | Al-Sheikh |
| 6,141,423 A | 10/2000 | Fischer |
| 6,167,517 A | 12/2000 | Gilchrist et al. |
| 6,202,151 B1 | 3/2001 | Musgrave et al. |
| 6,237,096 B1 | 5/2001 | Bisbee et al. |
| 6,263,438 B1 | 7/2001 | Walker et al. |
| 6,292,092 B1 | 9/2001 | Chow et al. |
| 6,310,966 B1 | 10/2001 | Dulude et al. |
| 6,311,272 B1 | 10/2001 | Gressel |
| 6,317,834 B1 | 11/2001 | Gennaro et al. |
| 6,320,974 B1 | 11/2001 | Glaze et al. |
| 6,345,104 B1 | 2/2002 | Rhoads |
| 6,430,688 B1 | 8/2002 | Kohl et al. |
| 6,505,193 B1 | 1/2003 | Musgrave et al. |
| 6,782,349 B2 | 8/2004 | Challener et al. |
| 6,934,861 B2 | 8/2005 | Haala |
| 6,938,157 B2 | 8/2005 | Kaplan |
| 7,062,651 B1 | 6/2006 | Lapstun et al. |
| 7,143,286 B2 | 11/2006 | Brown et al. |
| 7,181,441 B2 | 2/2007 | Mandato et al. |
| 7,275,155 B1 | 9/2007 | Aull |
| 7,325,141 B2 | 1/2008 | Chow et al. |
| 7,646,162 B2 | 1/2010 | Ma |
| 7,730,297 B1 | 6/2010 | Pravetz |
| 7,747,851 B1 | 6/2010 | Robinson et al. |
| 7,747,852 B2 | 6/2010 | Aull |
| 8,166,289 B2 | 4/2012 | Owens et al. |
| 8,429,423 B1 | 4/2013 | King et al. |
| 8,688,997 B2 | 4/2014 | Das et al. |
| 8,935,746 B2 | 1/2015 | Vetillard |
| 9,070,251 B2 | 6/2015 | Laputz et al. |
| 9,098,706 B1 | 8/2015 | Kennedy |
| 9,520,994 B2 | 12/2016 | Ponsini |
| 9,569,602 B2 | 2/2017 | Violleau et al. |
| 9,600,291 B1 | 3/2017 | Atsatt |
| 9,608,984 B2 | 3/2017 | Rogers et al. |
| 9,613,215 B2 | 4/2017 | Cox et al. |
| 9,830,456 B2 | 11/2017 | Grieco et al. |
| 2001/0010730 A1 | 8/2001 | Rhoads |
| 2002/0010679 A1 | 1/2002 | Felsher |
| 2002/0023220 A1 | 2/2002 | Kaplan |
| 2010/0122076 A1 | 5/2010 | Witty |
| 2014/0095876 A1* | 4/2014 | Smith .................. H04L 9/3265 713/171 |
| 2015/0012737 A1* | 1/2015 | Newell ................. G06F 21/575 713/2 |
| 2015/0154405 A1 | 6/2015 | Chen et al. |
| 2015/0268952 A1 | 9/2015 | Ponsini |
| 2016/0036587 A1 | 2/2016 | Hans et al. |
| 2016/0266943 A1 | 9/2016 | Hans |
| 2017/0039352 A1 | 2/2017 | Volkening et al. |
| 2017/0228412 A1 | 8/2017 | Agarwal et al. |
| 2017/0329943 A1 | 11/2017 | Choi et al. |
| 2018/0041341 A1* | 2/2018 | Gulati .................. H04L 9/3234 |
| 2018/0096154 A1* | 4/2018 | Na ........................ G06F 21/577 |
| 2018/0341787 A1 | 11/2018 | Perelman et al. |

OTHER PUBLICATIONS

Perez, "Silicon Systems Security and Building a Root of Trust", IEEE Asian Solid-State Circuits Conference; Nov. 9-11, 2015/ Xiamen, Fuijan, China; 4 pages.

Non Final Office Action for U.S. Appl. No. 16/359,744 dated Dec. 16, 2020.

* cited by examiner

BI-DIRECTIONAL CHAIN OF TRUST NETWORK

TECHNICAL FIELD

The present disclosure relates to computer security. More particularly, this disclosure relates to a system and method for establishing and maintaining a bi-directional chain of trust.

BACKGROUND

A Root of Trust (RoT) is a programmable hardware component that is able to perform a trusted boot. The RoT can automatically bring itself up to an operational state with tests for integrity and authenticity of any software or firmware to be executed within the RoT. The RoT does not need any external monitoring entity for continued trust monitoring as the ROT can monitor itself. The RoT can serve as a separate computing engine controlling a trusted computing platform cryptographic processor on a computing device in which the RoT is embedded. As such, a RoT can establish a chain of trust by validating the integrity and authenticity of each software and firmware component from an end entity up to a root certificate issued by a trusted authority. The chain of trust is intended to ensure that only trusted software, hardware and firmware can be used while retaining flexibility.

SUMMARY

In an example, a system for establishing and maintaining a chain of trust can include a root of trust (RoT) executing a root trusted server that can establish a trusted relationship between the root trusted server of the RoT and a given node, and monitor the given node to ensure that the given node executes trusted operations and to ensure that authenticated code and static data in memory associated with the given node are unchanged. The given node can include a trusted server that can push authenticated code into memory associated with another node, cause the other node to execute the authenticated code in response to the pushing to establish a trusted relationship between the given node and the other node and monitor the other node to ensure that the other node executes trusted operations and to ensure that the authenticated code and static data in the memory associated with the other node are unchanged. The other node can include a trusted server that can monitor the given node to ensure that the given node executes trusted operations and to ensure that the authenticated code and static data in the memory associated with the given node are unchanged based on maintenance information received for the given node.

In another example, a method can include establishing and maintaining, by a root trusted server of a root of trust (RoT) a trusted relationship between the RoT and a first node of a plurality of nodes. The root trusted server can ensure that the first node executes trusted operations and ensure that authenticated code and static data in memory associated with the first node are unchanged. The method can further include establishing and maintaining, by a trusted server of the first node, a trusted relationship between the first node and a second node of the plurality of nodes. The trusted server of the first node can ensure that the second node executes trusted operations and ensure that authenticated code and static data in memory associated with the second node are unchanged. The method can further include receiving, at the second node, maintenance information comprising information for maintaining the trusted relationship between the first node and the second node, and maintaining, by a trusted server of the second node, the trusted relationship between the first node and the second node based on the received maintenance information to ensure that the first node executes trusted operations and ensure that the authenticated code and static data in the memory associated with the first node are unchanged.

In a further example, a system for establishing and maintaining a chain of trust can include a root of trust (RoT) executing a root trusted server that can establish a trusted relationship between the root trusted server of the RoT and a first node, and monitor the first node to ensure that the first node executes trusted operations and to ensure that authenticated code and static data in memory associated with the first node are unchanged. The first node can include a trusted server that can establish a trusted relationship between the trusted server of the first node and a second node and/or a third node, and monitor the second node and the third node to ensure that the second node and the third node executes trusted operations and to ensure that respective authenticated code and static data in memory associated with the second node and the third node are unchanged. The second node can include a trusted server that can monitor the first node and the third node to ensure that the first node and the third node executes trusted operations and to ensure that the authenticated code and static data in memory associated with the first node and the third node are unchanged based on maintenance information received for the first node and the third node. The third node can include a trusted server that can monitor the first node and the second node to ensure that the first node and the second node executes trusted operations and to ensure that the authenticated code and static data in memory associated with the first node and the second node are unchanged based on maintenance information received for the first node and the second node.

DETAILED DESCRIPTION

Figure 1:
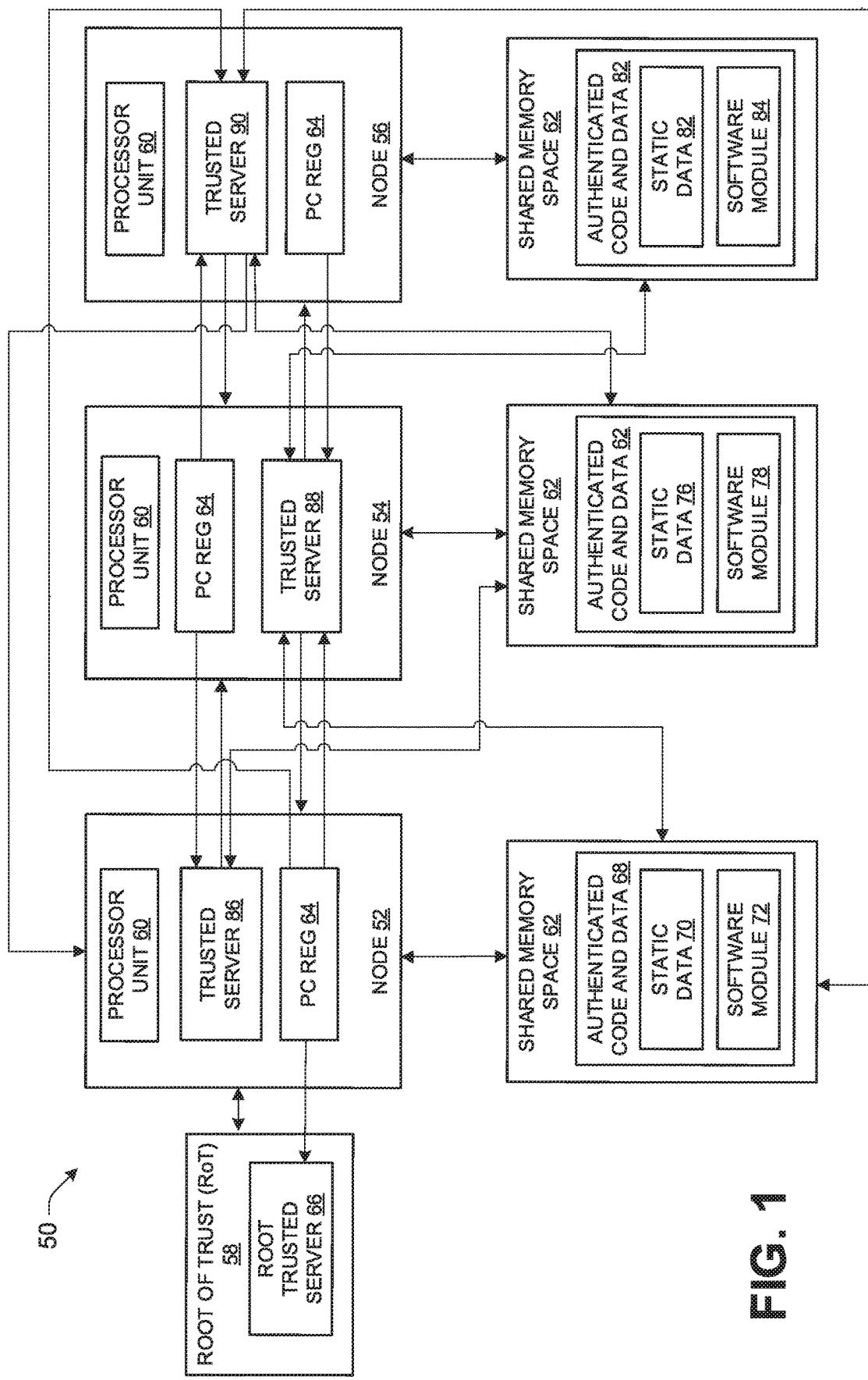
FIG. 1 illustrates an example of a system for establishing and maintaining a bi-directional chain of trust in a computing environment.

The present disclosure relates to systems and methods for establishing and maintaining a bi-directional chain of trust in a computing system. The system can include a root of trust (RoT) executing a root trusted server from which the chain of trust can initially extend. The RoT can be configured and/or programmed such that after boot-up, the RoT can execute a root trusted server. The root trusted server can establish and maintain a trusted relationship with one or more neighboring nodes (e.g., computing platforms such as processors). As used herein, "establishing and maintaining"

a trusted relationship ensures a trusted server (e.g., the root trusted server) that a node (e.g., operating as a trusted client) only executes trusted operations, namely operations that have been authenticated, as described herein.

To establish the trusted relationship between the RoT and the one or more neighboring nodes, in some examples, the root trusted server can hold the one or more neighboring nodes in reset to prevent the one or more neighboring nodes from executing respective code that has not been authenticated. The RoT can be configured to employ cryptographic techniques (e.g., a public key certificate) to authenticate a respective signed software package assigned to the one or more neighboring nodes. The RoT can push the authenticated code (e.g., machine code) into shared memory space associated with the one or more neighboring nodes. In some examples, the RoT can push the authenticated code for the one or more neighboring nodes into the shared memory space while the one or more neighboring nodes are being held in reset. In other examples, the one or more neighboring nodes are not held in reset while the authenticated code is being pushed into the shared memory space.

The root trusted server can record a memory address range of a static portion of the authenticated code and static data for each of the one or more neighboring nodes stored in the shared memory space. The root trusted server can re-authenticate the authenticated code and static data after the authenticated code is stored in the shared memory space, as described herein. The root trusted server can release the one or more neighboring nodes from reset (allowing the one or more neighboring nodes to boot) or activate the authenticated code in response to the pushing to finalize the trusted relationship between the trusted server of the RoT and the one or more neighboring nodes. In this manner, the one or more neighboring nodes can start-up as a trusted client of the root trusted server. Accordingly, the RoT can establish a trusted relationship with each of the one or more neighboring nodes to ensure that each neighboring node is executing trusted operations, namely operations that have been authenticated.

To maintain the trusted relationship, the root trusted server can monitor the one or more neighboring nodes to ensure that each neighboring node is executing trusted operations, namely operations that have been authenticated. For example, the root trusted server can monitor a value stored in a program counter (PC) register of a respective neighboring node to ensure that the node is only executing instructions that are stored within the memory address range of respective authenticated code. Additionally, to maintain the trusted relationship, the root trusted server can re-verify the authenticated code and static data for the respective neighboring node to ensure that the authenticated code remains unchanged, as described herein.

In some examples, a given node of the one or more neighboring nodes can extend the chain of trust from a RoT to another node that neighbors the given node. The given node can include a trusted server that can be initialized (e.g., by the root trusted server of the RoT or a trusted server of another node). The trusted server of the given node can operate in a same or similar manner as the root trusted server. Thus, the trusted server of the given node can establish a trusted relationship with the other node, and thereby extend the chain of trust from the RoT to the other node. In some examples, the trusted server of the given node can reset the other node to prevent the other node from executing code. Additionally, the trusted server of the given node can authenticate a signed software package (e.g., machine code) assigned to the other node. In other examples, the root trusted server can authenticate the signed software package assigned to the other node while the other node is held in reset (e.g., by the given node). The trusted server of the given node can access a shared memory space of the other node and push authenticated code into the shared memory space as the other node is being held in reset. In other examples, the trusted server can push the authenticated code into the shared memory space of the other node without resetting the other node.

The trusted server of the given node can record a memory address range of a static portion of the authenticated code and static data pushed into the shared memory of the other node. The trusted server of the given node can re-authenticate the authenticated code and static data after the authenticated code is stored in the shared memory space of the other node, as described herein. The trusted server of the given node can release the other node from reset or activate the authenticated code in response to the pushing to finalize the trusted relationship between the given node and the other node. This release can allow the other node to boot, execute the authenticated code to finalize the trusted relationship between the trusted server of the given node and the other node. As such, the other node can start-up as a trusted client of the trusted server of the given node. To maintain the trusted relationship, the trusted server of the given node can monitor the other node to ensure that the other node is executing trusted operations, namely operations that have been authenticated in a same or similar manner as the root trusted server monitors the given node as described herein.

In some examples, the other node can include a trusted server. The trusted server of the other node can operate in a same or similar manner as the trusted server of the given node, as described herein. The trusted server of the other node can be configured to maintain the trusted relationship established between the given node and the other node by accessing the shared memory space of the given node and re-verifying the authenticated code of the given node. The trusted server of the other node can re-verify that the static portion of the authenticated code and static data in the shared memory space of the given node has not been changed (e.g., altered). Additionally, the trusted server of the other node can monitor the value stored in the PC register of the given node to ensure that the given node is only executing instructions that are stored within the memory address range of the authenticated code. Accordingly, the trusted server of the other node can ensure that the given node is only executing operations, namely operations that have been authenticated.

By granting the other node access to the shared memory space and the PC register of the given node, and the given node access to the shared memory space and the PC register of the other node, the chain of trust established between the nodes can be maintained bi-directionally. The given node and the other node can maintain the trusted relationship established between each other to ensure that each node is only executing instructions that are stored within the memory address range, and ensure that the authenticated code and static data remains unchanged. Accordingly, each node in the system can ensure that one or more neighboring nodes are only executing operations that have been authenticated by maintaining the established trusted relationship bi-directionally.

In some examples, the trusted server of the other node can transfer (e.g., share) maintenance of the trusted relationship established between the given node and the other node to a third node, with which the other node has an established trusted relationship. By sharing a responsibility of the other node with the third node of maintenance of the trusted relationship established between the given node and the other node, the third node can be employed to ensure that the given node is only executing trusted operations, namely operations that have been authenticated. The third node can be configured to access the shared memory space of the given node. The third node can re-verify that the authenticated code and static data in the shared memory space of the given node has not been changed. Additionally, the third node can be configured to access the PC register of the given node and monitor the value stored in the PC register of the given node to ensure that the given node is only executing instructions that are stored within the memory address range of the authenticated code. Thus, in some examples, a given node of a pair of neighboring nodes can share maintenance of a trusted relationship established between the pair of neighboring nodes with a third node that neighbors the given node (or the pair of neighboring nodes). In further examples, the other node of the pair of neighboring nodes can share maintenance of the trusted relationship established between the pair of neighboring nodes with a fourth node (or in some examples with the third node) that neighbors the other node (or the pair of neighboring nodes). Accordingly, the established trusted relationship between neighboring nodes can be monitored remotely by another node (e.g., the RoT) that neighbors both the neighboring nodes in the system.

In some examples, the given node can be compromised (e.g., by a third party), such that the given node is not executing trusted operations. Upon determining that the given node is not executing trusted operations, the third node can notify the other node. In response, the other node can hold the given node in reset to prevent the given node from executing code (e.g., untrusted operations), and thereby stop the given node from executing untrusted operations. The trusted server of the other node can retrieve (or receive) a signed software package (e.g., machine code) assigned for the given node and authenticate the signed software package, as described herein. The trusted server of the other node can access the shared memory space of the given node and push the authenticated code into the shared memory space as the given node is being held in reset. The trusted server of the other node can record the memory address range of the static portion of the authenticated code and static data pushed into the shared memory of the given node. The trusted server of the other node can re-authenticate the authenticated code and static data after the authenticated code is stored in the shared memory space of the given node in a same or similar manner as the root trusted server, as described herein.

In other examples, the third node can hold the given node in reset, and the trusted server of the third node can access the shared memory space of the given node and push retrieved (or received) authenticated code into the shared memory space as the given node is being held in reset. The trusted server of the third node can record the memory address range of the static portion of the authenticated code and static data pushed into the shared memory of the given node. The trusted server of the third node can re-authenticate the authenticated code and static data after the authenticated code is stored in the shared memory space of the given node in a same or similar manner as the root trusted server, as described herein.

The trusted server of the other node can release the given node from reset or activate the authenticated code in response to the pushing to establish a new trusted relationship with the given node. This release can allow the given node to boot, execute the authenticated code to finalize the establishment of the new trusted relationship between the given node and the other node. Upon establishing the new trusted relationship, the trusted server of the other node can switch to a trust maintenance operation and monitor the authenticated code and static data and the PC register of the given node to ensure that the given node is only executing trusted operations, namely operations that have been authenticated. In other examples, the trusted server of the other node can transfer (e.g., share) maintenance of the new established trusted relationship between the given node and the other node with the third node, and the third node can be configured to maintain the new established trusted relationship in a same or similar manner as described herein.

In some examples, the RoT and each of the nodes in the systems described herein can be configured to communicate information based on an authentication protocol. The RoT and each of the nodes may be configured to communicate via a data interface. In some examples, the data interface can be representative of a communication system (e.g., a computer bus) that can allow the RoT and each of the nodes to communicate data (e.g., messages). In an example, the authentication protocol can be a challenge-response authentication protocol and can be used to confirm that a processor of a given node is operating normally (e.g., not in a hang state). By enabling each node to communicate via the digital interface with other nodes in the system, nodes can be configured to communicate with one or more others nodes (e.g., periodically or asynchronously) to confirm that the nodes are operating within normal operating conditions (e.g., not in a hang state). As such, malfunctioning nodes can be detected more effectively and efficiently in the systems described herein by employing the digital interface to communicate with other nodes to confirm that the other nodes are operating normally.

Accordingly, by employment of the systems and methods described herein, the chain of trust can be extended from the RoT to a plurality of nodes. The plurality of nodes can be configured to bi-directionally maintain the established trusted relationship, as described herein. The systems and methods described herein can be scaled for any number of nodes and allow for a chain of trust established between neighboring nodes to be maintained bi-directionally, such that a web of trust can be provided wherein each node is maintaining the chain of trust established with one or more neighboring node.

FIG. 1 illustrates an example of a system 50 for establishing and maintaining a bi-directional chain of trust between neighboring nodes 52, 54, 56 in a computing environment. The system 50 can include a first node 52, a second node 54, a third node 56, and a Root of Trust (RoT) 58. The RoT 58 can be configured to extend the chain of trust, as described herein. For purposes of simplification of explanation, in the example illustrated, the system 50 includes the first node 52, the second node 54 and a third node 56, but in other examples, many more nodes (e.g., any number of nodes) can be employed. In some examples, wherein a plurality of nodes are employed, the first node 52, the second node 54 and the third node 56 of the plurality of nodes can be neighboring nodes. A "neighboring node" as used herein refers to a node that can access a memory (e.g., a shared memory space) and a program counter (PC) register of another node. A "shared memory space" as used herein refers to a location in physical memory (e.g., a memory device) associated with a given node that another node (e.g., a neighboring node) can access (e.g., read, write, etc.). In some examples, the physical memory is common to one or more nodes (e.g., the one or more nodes employ the physical memory).

The first node 52, the second node 54 and the third node 56 can be representative of a computing platform. That is, the first node 52, the second node 54 and the third node 56 can each be an instance of hardware capable of executing machine-readable instructions. Thus, the first node 52, the second node 54 and the third node 56 can include a processor unit 60. The first node 52, the second node 54 and the third node 56 can have a shared memory space 62. In some examples, the shared memory space 62 can correspond to a memory device that, the first node 52, the second node 54 and the third node 56 can access. As such, in some examples, the shared memory space 62 can be representative of a memory device such as volatile memory (e.g., random access memory (RAM)). In other examples, other types of memory can be used. In some examples, the memory device is a multi-port memory device. In further examples, each of the first node 52, the second node 54 and the third node 56 can have respective shared memory spaces 62 (e.g., memory devices) that the other neighboring node can access, as shown in FIG. 1.

The shared memory space 62 can store machine-readable instructions and data for each of the first, second and third nodes 52, 54, 56. The processor unit 60 of each node 52, 54, 56 can be configured to access a corresponding shared memory space 62 and execute respective machine-readable instructions and/or data stored therein. The processor unit 60 can be implemented as one or more processor cores. In some examples, a subset (or all) the first node 52, the second node 54 and the third node 56 can be implemented on a single, multi-core processor chip. In other examples, the first node 52, the second node 54 and the third node 56 can be implemented as separate computing devices (e.g., separate processor chips).

The first node 52, the second node 54 and the third node 56 can be each associated with a PC register 64 (labeled in FIG. 1 as "PC REG"), such that there are an equal number of PC registers 64 as nodes. The PC register 64 of the first node 52, the second node 54 and the third node 56 can store an address of a next instruction that is to be executed by the corresponding processor unit 60. The PC register 64 of the first, second and third nodes 52, 54, 56 can "point to" the next instruction to be executed by the processing unit 60 of a respective node. In some examples, the PC register 64 can be referred to as an instruction pointer (IP), instruction address register (IAR), an instruction counter (IC) or an instruction sequencer (IS).

The RoT 58 can be implemented as a stand-alone hardware device, namely an integrated circuit (IC) chip, such as an Application Specific Integrated Circuit (ASIC) chip, a Field Programmable Gate Array (FPGA), etc. The RoT 58 can include an embedded signed public key certificate. The signed public key certificate can be issued by a trusted authority that securely stores a private key of an asymmetric encryption key pair (sometimes referred to simply as a "key pair"). The signed public key certificate can include a public key of the asymmetric encryption key pair. In this manner, the public key of the signed public key certificate can be employable to decrypt data encrypted with the private key of the trusted authority. In some examples, the signed public key certificate can include an encrypted version of a hash of the public key (the hash may also be referred to as a message digest) and a plaintext version of the public key. The encrypted version of the hash of the public key has been encrypted with the private key of the trusted authority. A hash function employed to generate the hash of the public key can be stored in software, firmware or hardware or the RoT 58.

In some examples, the RoT 58 can access the shared memory space 62 of the first node 52. In further examples, the RoT 58 can also access the shared memory space 62 of the second node 54 and/or the third node 56. Upon boot-up and/or reset, the RoT 58 can execute a sequence of actions to initiate an establishment of a chain of trust on the system 50. In some examples during the boot-up sequence, the RoT 58 can decrypt the encrypted version of the hash of the public key using the public key of the trusted authority embedded in the self-signed root pubic key certificate to form a decrypted hash. Additionally, during the boot-up sequence, the RoT 58 can execute the hash function on the public key and compare the results of the hash to the decrypted hash to verify the authenticity and integrity of the public key certificate. In a similar manner, the RoT 58 can employ the (authenticated) public key certificate to authenticate a software package or subordinate certificates signed by the trusted authority to verify the authenticity and the integrity of the software package. In other examples, additional and/or other authentication techniques can be employed to verify the authenticity and the integrity of the software package. Continuing with the boot-up sequence, in response to verifying the authenticity and integrity of the software package, the RoT 58 can execute a root trusted server 66 based on the software package. Upon execution, the boot-up sequence of the RoT 58 is completed.

In some examples, in response to completion of the boot-up, the root trusted server 66 can execute a trust initialization operation that can establish a trusted relationship with the first node 52, thereby extending the chain of trust to the first node 52. In some examples, the trust initialization operation can include extending the chain of trust from the first node 52 to the second node 54 and/or to the third node 56. In other examples, the trusted server 66 can establish a trusted relationship with the second node 54 and/or the third node 56 as well in a same or similar manner. In some examples, during the trust initialization operation, the root trusted server 66 can set the first node 52 in reset and hold the first node 52 in reset. As used herein the phrase "hold in reset" (and its derivatives) indicates that a node (e.g., the first node 52 in the present example) is powered-on, and is prevented by another node (e.g., the root trusted server 66 in the present example) from booting and/or executing respective machine-readable instructions.

Continuing with the trust initialization operation, the root trusted server 66 can locate (e.g., receive or retrieve) a signed software package assigned to the first node 52 (which can be stored internally or externally to the first node 52) that can be digitally signed by the trusted authority. Alternatively, the software package assigned to the first node 52 can be signed with a subordinate certificate by another entity that can be authorized to do so. In such a situation, the subordinate certificate can be authenticated by the signed public key certificate, and (after authentication), the subordinate certificate can be employed to authenticate the software package assigned to the first node 52. The RoT 58 can employ the public key certificate to verify the authenticity and integrity of the signed software package.

Furthermore, in some examples, the root trusted server 66 can extract and store an encrypted (e.g., by the private key of the trusted authority) hash of the static portions of the signed software package, which can correspond to a signature of the signed software package. In some examples, the encrypted hash of the static portions of the signed software package can be referred to as a "pristine hash" or "golden hash". In such examples, the signed software package can include information characterizing where the static portion of the signed software package can be positioned in the overall signed software package so that the root trusted server 66 can know what portion of the memory of the first node 52 to produce confirmation hashes from.

Upon authenticating the signed software package for the first node 52, continuing with the trust initialization operation, the root trusted server 66 can push the authenticated software package assigned to the first node 52 into the shared memory space 60 of the first node 52, where the software package resides as authenticated code and data 68. As used herein, the term "pushes" (and its derivatives) indicates that an external node (e.g., the root trusted server 66 of the RoT 58 in the present example) executes or causes execution of a memory write (e.g., including, but not limited to, a direct memory access (DMA) write) to memory (e.g., the shared memory space 62). The root trusted server 66 can record (e.g., store) the memory address range of a static portion of the authenticated code and data 68 and corresponding static data 70 that includes (or is associated with) a software module 72. It is noted that the "authenticated code" corresponds to static portions of a software module (e.g., the software module 72) and the "static data" refers to portions of program data that are unchanging (e.g., static) during execution. Portions of the software module 72 that are not static, such as dynamic data of the program data are not part of the authenticated code and data 68 or the corresponding static data 70.

In other examples, the root trusted server 66 can push the authenticated software package assigned to the first node 52 into the shared memory space 62 of the first node 52 without resetting the first node 52. For example, the authenticated software package can include an application launcher embedded therein. Such an application launcher can cause the first node 52 to execute an application from a specific memory address in response to an activation signal being provided from the root trusted server 66. In such examples, the shared memory space 62 of the first node 52 can include a reserved memory range in the static data 70 to receive the authenticated software package without reset. Moreover, in these examples, the root trusted server 66 can change a memory range for the authenticated code and data 68 of the first node 52 to the reserved memory range in the static data 70.

Additionally, continuing with the trust initialization operation, upon pushing the authenticated software package to the first node 52 (corresponding to the authenticated code and data 68), the root trusted server 66 can re-authenticate the authenticated code and data 68 by executing a hash on the authenticated code and data 68 and the corresponding static data 70, and comparing the hash to a decrypted version of a hash from the authenticated software package. In some examples, the memory address range can be hashed and an encrypted hash of the memory address range (e.g., stored in the authenticated software package) can be decrypted by the root trusted server 66. The results of the hashed memory address range and the decrypted hashed memory address range can be compared by the root trusted server 66 to verify that the authenticated code and data 68 is correctly placed in the shared memory 62 of the first node 52.

Continuing with the trust initialization operation, upon pushing the software package to the first node 52 (corresponding to the authenticated code and data 68), the root trusted server 66 can finalize the trusted relationship between the root trusted server 66 and the first node 52. In some examples, to finalize the trusted relationship, the root trusted server 66 can release the first node 52 from reset, allowing the first node 52 to boot and execute machine code for the software module 72, such that the first node 52 starts-up as a trusted client for the root trusted server 66. Alternatively, to finalize the trusted relationship, the root trusted server 66 can provide an activation signal causing the first node 52 to execute the software module 72. In either situation, the root trusted server 66 can cause the first node 52 to execute the software module 72 in the shared memory 62 in response to the pushing to finalize the trusted relationship between the RoT 58 and the first node 52. Upon finalizing the trusted relationship, the trusted relationship is established and the trust initialization operation is completed. It is noted that the trusted relationship is established upon executing each action of the trusted initialization operation. That is, if an action of the trusted initialization operation is unable to complete successfully (e.g., such as a failed authentication), the trusted relationship is not established between the RoT 58 and the first node 52.

The root trusted server 64 can switch to a trust maintenance operation to maintain the trusted relationship with the first node 52. To maintain the trusted relationship, the root trusted server 66 can monitor the authenticity and integrity of the static portion of the software module 72 operating on the first node 52. For example, periodically, continuously and/or asynchronously the root trusted server 66 can re-verify the authenticated code and data 68 and the corresponding static data 70 in the shared memory space 62 of the first node 52. As used herein, the term "re-verify" (or its derivatives) of the authenticate code and the corresponding static data refers to executing a hash on the authenticated code and the corresponding static data in memory (e.g., the shared memory space 62) of a node (e.g., the first node 52) by a server (e.g., by the root trusted server 66), and the server compares the hash to a previously stored hash (e.g., a "pristine hash") of the authenticated code and the corresponding static data.

Additionally, the root trusted server 66 can monitor (e.g., periodically, continuously and/or asynchronously) a value stored in the PC register 64 of the first node 52 to ensure that the first node 52 is only executing operations in the memory address range recorded for the static portion of the authenticated code and data 68. In response to the root trusted server 66 verifying the authenticity and the integrity of the authenticated code and data 68 and the corresponding static data 70 in the shared memory space 62 of the first node 52, and that the PC register 64 of the first node 52 only stores addresses within the memory address range recorded for the static portion of the authenticated code and data 68, the root trusted server 66 can be assured that the first node 52 is only executing trusted operations and that the corresponding static data 70 in the shared memory space 62 is unchanged.

In some examples, the root trusted server 66 can establish a trusted relationship with the second node 54 in a same or similar manner as the root trusted server 66 established the trusted relationship with the first node 52. To maintain the trusted relationship established between the root trusted server 66 and the second node 54, the root trusted server 66 can monitor the authenticity and integrity of a static portion of a software module 78 operating on the second node 54. For example, periodically, continuously and/or asynchronously the root trusted server 66 can re-verify an authenticated code and data 74 and corresponding static data 76 in the shared memory space 62 of the second node 54, and a value stored in the PC register 64 of the second node 54 to ensure that the second node 54 is only executing trusted operations and that the corresponding static data 76 in the shared memory space 62 of the second node 54 is unchanged. Accordingly, in some examples, the root trusted server 66 can be assured that the second node 54 is only executing trusted operations, namely operations that have been authenticated.

In some examples, the root trusted server 66 can establish a trusted relationship with the third node 56 in a same or similar manner as the root trusted server 66 established the trusted relationship with the first node 52. To maintain the trusted relationship established between the root trusted server 66 and the third node 56, the root trusted server 64 can monitor the authenticity and integrity of a static portion of a software module 84 operating on the third node 56. For example, periodically, continuously and/or asynchronously the root trusted server 64 can re-verify the authenticated code and data 80 and corresponding static data 82 in the shared memory space 62 of the third node 56, and a value stored in the PC register 64 of the third node 56 to ensure that the third node 56 is only executing trusted operations and that the corresponding static data 82 in the shared memory space 62 of the third node 56 is unchanged. Accordingly, in some examples, the root trusted server 66 can be assured that the third node 56 is only executing trusted operations, namely operations that have been authenticated.

In some examples, the first node 62 can include a trusted server 86. The trusted server 86 can be initialized in response to the root trusted server 66 releasing the first node 52 from reset to allow the first node 52 to boot and execute the machine code for the software module 72. The trusted server 86 can be initialized such that the first node 52 is provided as a combination of a trusted client and a trusted server or elevated from a trusted client to a combination of a trusted client and a trusted server, thereby extending the chain of trust in the system 50. In an example, the trusted server 86 can be configured as a memory controller (e.g., as a hardware element, a software element or a combination thereof). The trusted server 86 of the first node 52 can be configured with respect to the second node 54 such that the trusted server 86 of the first node 52 can function as a memory controller for the second node 54, thereby controlling access (e.g., flow of data) to the shared memory space 62 of the second node 54 (e.g., by the processor unit 60 of the second node 54).

In some examples, the shared memory space 62 of the second node 54 is a multi-port memory device. In these examples, the processor unit 60 of the second node 54 can access the dual-port memory device without going through the trusted server 86 of the first node 52. Accordingly, the trusted server 86 of the first node 52 can be granted access to the shared memory space 62 of the second node 54 to ensure that the second node 54 is executing only trusted operations, namely operations that have been authenticated, as described herein.

In some examples, the trusted server 86 of the first node 52 can operate in a same or similar manner as the root trusted server 66. Accordingly, the trusted server 86 of the first node 52 can execute a trust initialization operation to establish a trusted relationship with the second node 54, and thereby extend the chain of trust in the system 50. For example, during a trust initialization operation, the trusted server 86 of the first node 52 can reset the second node 54 and hold the second node 54 in reset. Continuing with the trust initialization operation, before the second node 54 is released from reset, the trusted server 86 of the first node 52 can locate (e.g., receive or retrieve) a signed software package assigned to the second node 54 and authenticate the signed software package to verify the authenticity and integrity of the signed software package. In other examples, the second node 54 is not reset. In these examples, the signed software package can include an application launcher that can be activated by the trusted server 86 of the first node 52.

Furthermore, in some examples, the trusted server 86 of the first node 52 can extract and store an encrypted (by the private key of the trusted authority) hash of the signed software package, which can correspond to a signature of the signed software package. Additionally, continuing with the trust initialization operation, the trusted server 86 of the first node 52 can push the authenticated software package into the shared memory space 62 of the second node 54 to form an authenticated code and data 74 for the second node 54. The authenticated code and data 74 for the second node 54 can include (or be associated with) a software module 76 that can include machine-readable instructions. The memory address range of the static portion of the authenticated code and data 74 and corresponding static data 76 in the shared memory space 62 of the second node 54 can be recorded (e.g., stored) by the trusted server 86 of the first node 52 for subsequent authentication and/or monitoring. In some examples, the memory address range can be hashed and an encrypted hash of the memory address range (e.g., stored in the signed software package) can be decrypted by the trusted server 86 of the first node 52. The results of the hashed memory address range and the decrypted hashed memory address range can be compared by the trusted server 86 of the first node 52 to verify that the authenticated code 74 is correctly placed in the shared memory space 62 of the second node 54. Continuing with the trust initialization operation, the trusted server 86 of the first node 52 can re-authenticate the authenticated code and data 74 for the second node 54 after the authenticated code and data 74 is pushed into the shared memory 62 for the second node 54.

Continuing with the trust initialization operation, upon storing the memory address range of the authenticated code and data 74 and re-authenticating the authenticated code and data 74 for the second node 54, the trusted relationship can be finalized with the second node 54. In some examples, to finalize the trusted relationship, the trusted server 86 of the first node 52 can release the second node 54 from reset, allowing execution of trusted operations (machine executable code within the recorded memory address range of the static portion of the authenticated code and data 74 in the shared memory space 62), such that the second node 54 starts-up as a trusted client for the trusted server 86 of the first node 52. Alternatively, to finalize the trusted relationship, the trusted server 86 of the first node 52 can provide an activation signal causing the second node 54 to execute the software module 78. In either example, the trusted server 86 of the first node 52 can cause the second node 54 to execute the software module 78 in response to the pushing to finalize the trusted relationship between the trusted server 86 and the second node 54. Upon finalizing the trusted relationship, the trusted relationship is established between the trusted server 86 of the first node 52 and the second node 54. As noted, the trusted relationship is established upon executing each action of the trusted initialization operation. That is, if an action of the trusted initialization operation is unable to complete successfully (such as a failed authentication), the trusted relationship is not established between the trusted server 86 of the first node 52 and the second node 54.

To maintain the trusted relationship, the trusted server 86 of the first node 52 can switch to a trust maintenance operation. In the trust maintenance operation, the trusted server 86 can monitor the authenticity and integrity of the static portion of the software module 78 operating on the second node 54. For example, periodically, continuously and/or asynchronously the trusted server 80 of the first node 52 can re-verify the authenticated code and data 74 and the corresponding static data 76 in the shared memory space 62 of the second node 54. Thus, the trusted server 86 of the first node 52 can monitor the authenticated code and data 74 and the corresponding static data 76 in the shared memory space 62 of the second node 54 and the PC register 64 of the second node 54 to verify that the second node 54 is only executing trusted operations and to ensure that the authenticated code and data 74 and the corresponding static data 76 in the shared memory space 62 of the second node 54 is unchanged.

In some examples, the second node 54 can include a trusted server 88. The trusted server 88 can be initialized in response to the trusted server 86 of the first node 52 releasing the second node 54 from reset to allow the second node 54 to boot and execute the machine code for the software module 78. The trusted server 88 of the second node 54 can be initialized such that the second node is 54 is provided as a combination of a trusted client and a trusted server or elevated from a trusted client to a combination of a trusted client and a trusted server, thereby extending the chain of trust in the system 50. Thus, the trusted server 82 of the second node 54 can be configured to access the shared memory space 62 of the first node 52 to ensure that the authenticated code and data 68 and the corresponding static data 70 in the shared memory space 62 of the first node 52 is unchanged, as described herein. In additional examples, the trusted server of the second node 54 can be configured to access the shared memory space 62 of the third node 56 to ensure that the authenticated code and data 80 and the corresponding static data 82 in the shared memory space 62 of the third node 56 is unchanged, as described herein. Accordingly, a trusted server of a given node can be configured to access a shared memory space of one or more other nodes in the system 50 to ensure an authenticated code and corresponding static data in the shared memory space of the one or more other nodes is unchanged.

The trusted server 88 of the second node 54 can operate in a same or similar manner as the trusted server 86 of the first node 52. The trusted server 88 of the second node 54 can maintain the trusted relationship established between the first node 52 and the second node 54. Since the second node 54 can access the shared memory space 62 of the first node 52, the trusted server 88 of the second node 54 can re-verify that the static portion of the authenticated code and data 68 and the corresponding static data 70 in the shared memory space 62 of the first node 52 has not been changed.

For example, the trusted server 88 of the second node 54 can monitor the authenticity and integrity of the static portion of the software module 72 operating on the first node 52 to maintain the trusted relationship between the first and second nodes 52, 54. The trusted server 88 of the second node 54 can (e.g., periodically, continuously and/or asynchronously) re-verify the authenticated code and data 68 and the corresponding static data 70 in the shared memory space 62 of the first node 52. In some examples, the trusted server 88 of the second node 52 can locate (e.g., receive or retrieve) the previously stored hash of the authenticated code and data 68 and the corresponding static data 70 in the shared memory space 62 of the first node 52. The trusted server 88 can execute a hash on the authenticated code and data 68 and the corresponding static data 70 in the shared memory space 62 of the first node 52 and compare the hash to the previously stored hash (e.g., a "pristine hash") of the authenticated code and data 68 and the corresponding static data 70 to re-verify the authenticated code and data 68 and the corresponding static data 70 in the shared memory space 62 of the first node 52.

In some examples, the trusted server 88 of the second node 54 can locate (e.g., receive or retrieve) a recorded memory address range for the static portion of the authenticated code and data 68 and corresponding static data 70 that includes the software module 72. The trusted server 88 of the second node 54 can monitor (e.g., periodically, continuously and/or asynchronously) the value stored in the PC register 64 of the first node 52 to ensure that the first node 52 is only executing operations in the memory address range recorded for the static portion of the authenticated code and data 68. In response to the trusted server 88 verifying the authenticity and the integrity of the authenticated code and data 68 and the corresponding static data 70 in the shared memory space 62 of the first node 52, and that the PC register 64 of the first node 52 only stores addresses within the memory address range recorded for the static portion of the authenticated code and data 68, the trusted server 88 can be assured that the first node 52 is only executing trusted operations and that the authenticated code and data 68 and the corresponding static data 70 in the shared memory space 62 of the first node 52 is unchanged.

Accordingly, by granting the second node 54 access to the shared memory space 62 and the PC register 64 of the first node 52, and the first node 52 access to the shared memory space 62 and the PC register 64 of the second node 54, the chain of trust established between the nodes 52,54 can be maintained bi-directionally. Each node 52, 54 can maintain the trusted relationship established between each other to ensure that each node 52, 54 is only executing instructions that are stored within the memory address range, and that the authenticated code and data 68,74 and the corresponding static data 70,76 in the shared memory space 62 of each node 52, 54 is unchanged.

In some examples, a trusted relationship established between two neighboring nodes can be shared with another node for remote monitoring. For example, the trusted server 88 of the second node 54 can transfer (e.g., share) maintenance of the trusted relationship established between the first node 52 and the second node 54 with the third node 56. By sharing a responsibility of the second node 54 with the third node 566 of maintenance of the trusted relationship established between the first and second nodes 52, 54, the third node 56 can be employed to ensure that the first node 52 is only executing trusted operations, namely operations that have been authenticated. In some examples, prior to sharing maintenance of the established relationship between the first and second nodes 52, 54 with the third node 56, the trusted server 88 of the second node 54 can establish a trusted relationship with the third node 56, and thereby extend the chain of trust in the system 50. The trusted relationship with the third node 56 can be established in a same or similar manner as the trusted server 86 of the first node 52 established the trusted relationship with the second node 54.

Upon establishing the trusted relationship with the third node 56, the trusted server 88 of the second node 54 can provide a copy of the previously stored hash of the authenticated code and data 68 and the corresponding static data 70 in the shared memory space 62 of the first node 52. The third node 56 (e.g., a trusted server 90 of the third node 56) can access the shared memory space 62 of the first node 52 to re-verify the authenticated code and data 68 and the corresponding static data 70 in the shared memory space 62 of the first node 52. For example, the trusted server 90 of the third node 56 can execute a hash on the authenticated code and data 68 and the corresponding static data 70 in the shared memory space 62 of the first node 52 provided by the second node 54 and compare the hash to the previously stored hash (e.g., a "pristine hash") of the authenticated code and data 68 and the corresponding static data 70 to re-verify the authenticated code and data 68 and the corresponding static data 70 in the shared memory space 62 of the first node 52.

In some examples, the trusted server 90 of the third node 56 can locate (e.g., receive or retrieve) a recorded memory address range for the static portion of the authenticated code and data 68 and corresponding static data 70 that includes (or is associated with) the software module 72. The trusted server 90 of the third node 56 can monitor (e.g., periodically, continuously and/or asynchronously) the value stored in the PC register 64 of the first node 52 to ensure that the first node 52 is only executing operations in the memory address range recorded for the static portion of the authenticated code and data 68. In response to the trusted server 90 of the third node 56 verifying the authenticity and the integrity of the authenticated code and data 68 and the corresponding static data 70 in the shared memory space 62 of the first node 52, and that the PC register 64 of the first node 52 only stores addresses within the memory address range recorded for the static portion of the authenticated code and data 68, the trusted server 90 of the third node 56 can be assured that the first node 52 is only executing trusted operations and that the corresponding static data 70 in the shared memory space 62 of the first node 52 is unchanged. The trusted server 90 of the third node 56 can communicate with the trusted server 88 of the second node 52 to notify the trusted server 88 of the second node 52 that the first node 52 is executing only trusted operations.

In some examples, the first node 52 can be compromised by a third party (e.g., attacked by the third party) such that the first node 52 is not executing trust operations, namely operations that have been authenticated. Upon the third node 56 determining that the first node 52 is not executing trust operations, the trusted server 90 of the third node 56 can notify the second node 54. In response, the trusted server 88 of the second node 54 can reset the first node 52 and hold the first node 52 in reset. Before the first node 52 is released from reset, the trusted server 88 of the second node 54 can locate (e.g., receive or retrieve) a signed software package assigned to the first node 52 and authenticate the signed software package to verify the authenticity and integrity of the signed software package in a same or similar manner as the root trusted server 66. The trusted server 88 of the second node 54 can push the authenticated software package into the shared memory space 62 of the first node 52 to reload the authenticated code and data 68. The memory address range of the static portion of the authenticated code and data 68 and the corresponding static data 70 in the shared memory space 62 of the first node 52 can be re-recorded (e.g., stored) by the trusted server 88 of the second node 54 for subsequent authentication and/or monitoring.

The trusted server 88 of the second node 54 can re-authenticate the authenticated code and data 68 for the first node 52 after the authenticated code and data 68 is pushed into the shared memory space 62 of the first node 52 in a same or similar manner as the root trusted server 66. Upon storing the memory address range of the authenticated code and data 68 and re-authenticating the authenticated code and data 68 for the first node 52, a new trusted relationship can be finalized between the trusted server 88 of the second node 54 and the first node 52, and thereby extending the chain of trust to the first node 52. The trusted servers 86, 88 of the first and second nodes 52, 54 can maintain the new trusted relationship established between each other in a same or similar manner as described herein. Accordingly, the first and second nodes 52, 54 can maintain the new trusted relationship between each other bi-directionally. In other examples, the trusted server 88 of the second node 54 can share maintenance of the new trusted relationship established between the first node 52 and the second node 54 with the third node 564 for remote monitoring, as described herein.

As mentioned, the trusted server 88 of the second node 54 can operate in a same or similar manner as the trusted server 86 of the first node 52 and can execute a trust initialization operation to establish a trusted relationship between the trusted server 88 of the second node 54 and the third node 56, as described herein. Upon establishing the trusted relationship with the third node 56, the trusted server 88 of the second node 54 can switch to a trust maintenance operation and monitor the authenticated code and data 80 and corresponding static data 82 and the PC register 64 of the third node 56 to verify that the third node 56 is only executing trusted operations and that the authenticated code and data 80 and corresponding static data 72 in the shared memory space 62 of the third node 56 is unchanged. In some examples, the trusted server 90 of the third node 56 can be configured to operate in a same or similar manner as the trusted server 88 of the second node 54.

The trusted server 90 of the third node 56 can monitor the authenticity and integrity of the static portion of the software module 78 operating on the second node 54 in a same or similar manner as the second node 54 to maintain the trusted relationship established between the second node 54 and the third node 56. In some examples, wherein the third node 56 is a neighboring node of the first node 52, and a trusted relationship has been established between the first node 52 and the third node 56, the trusted server 90 of the third node 56 can monitor the authenticity and integrity of the static portion of the software module 72 operating on the first node 52 in a same or similar manner as the second node 54 to maintain the trusted relationship established between the first node 52 and the third node 56. Accordingly, the third node 56 can monitor both the first and second nodes 52, 54 to ensure that each node 52, 54 is executing only trusted operations, namely operations that have been authenticated.

In some examples, the RoT 58 and each of the nodes 52, 54, 56 can be configured to communicate based on an authentication protocol to confirm an operational state of one or more nodes in the system 50. As such, in some examples, the RoT 58 and each of the nodes 52, 54, 56 may be configured to communicate via a data interface. In some examples, the data interface can be representative of a communication system (e.g., a computer bus) that can allow the RoT 58 and each of the nodes 52, 54, 56 to communicate data (e.g., messages). In some examples, wherein the second node 54 shares a maintenance of the trusted relationship established between the first node 52 and the second node 54 with the third node 56, as described herein, the data interface may be employed to provide the copy of the previously stored hash of the authenticated code and data 68 and the corresponding static data 70 in the shared memory space 62 of the first node 52. In some examples, the trusted server 90 of the third node 56 can employ the data interface to locate (e.g., receive or retrieve) the recorded memory address range for the static portion of the authenticated code and data 68 and corresponding static data 70 that includes (or is associated with) the software module 72. In other examples, the second node 54 may provide the recorded memory address range for the static portion of the authenticated code and data 68 and corresponding static data 70 in a message to the third node 56. In further examples, each of the nodes 52, 54, 56, 58 may employ the data interface to communicate status information for one or more neighboring nodes. The status information can include information on whether the one or more neighboring nodes have been compromised, operational parameters of the one or more neighboring nodes, and/or an operation state of the one or more neighboring nodes.

In an example, the authentication protocol can be a challenge-response authentication protocol and can be used to confirm that a processor of a given node is operating normally (e.g., not in a hang state). A hang state can correspond to processor state wherein a processor is experiencing a hardware and/or software defect. In some examples, a given node (e.g., the first node 52, the second node 54, the third node 56, the RoT 58, etc.) can be configured to generate a random-number. In some examples, the random-number is a nonce, which is a number that is used only once, e.g. for a given communication session. The given node can encrypt the generated random-number according to a private key for the given node to generate an encrypted random-number. The given node can communicate via the data interface a challenge message that can include the encrypted random-number to another node (e.g., the first node 52, the second node 54, the third node 56, the RoT 58, etc.).

The other node can decrypt the encrypted random-number according to a public key for the given node to recover the random-number. In response, the other node can be configured to encrypt the decrypted random-number and, in some examples, additional data, according to a private key for the other node. The other node can communicate via the data interface a response message that can include the encrypted random-number and/or the additional data to the given node. The given node can decrypt the response message according to the public key for the other node to recover the random-number and/or the additional data. In response to recovering the random-number, the given node can be assured that the other node is operating normally (e.g., not in a hang state). In some examples, the give node may confirm that the processor of the other node is operating normally prior to establishing a trusted relationship with the other node.

In some examples, the processor (e.g., the processor unit 60) of the other node may be operating outside normal operating parameters (e.g., experiencing a hang state), and fail to respond to the challenge message from the given node. In response to the given node not receiving the response message, the given node (or a different neighboring node) can hold the other node in reset, push a signed software package into a shared memory space (e.g., the shared memory space 62) of the other node while the other node is in reset to reload the authenticated code in a same or similar manner as described herein. Accordingly, by allowing each node to communicate via the digital interface with one or more other nodes in the system 50, nodes can be configured to communicate with one or more others nodes (e.g., periodically or asynchronously) to confirm that the nodes are operating within normal operating conditions (e.g., not in a hang state). As such, malfunctioning nodes can be detected more effectively and efficiently in the system 50 by employing the digital interface to communicate with other nodes to confirm that the other nodes are operating normally. In addition, employing cryptographic techniques and use of a random-number such as a nonce protects the system 50 against replay attacks.

Accordingly, by employment of the system 50, the chain of trust can be extended from the RoT 588 to the first, second and third nodes 52, 54, 56. Each node 52, 54, and/or 56 in the system 50 can access the shared memory 6262 space of the other node 52, 54, and/or 56 to ensure that each node 52, 54, and/or 56 is executing only trusted operations, namely operations that have been authenticated. By granting each node 52, 54, and/or 56 access to respective shared memory spaces 62 and PC registers 64 can ensure that attacks by a third party only bring down a given node (e.g., the first node 52) and not any other nodes (e.g., the second node 54) that the given node was responsible for maintaining an established trusted relationship. As such, the system 50 can minimize the impact of third party attacks on the system 50 by taking off-line only the node that is under attack (or has been attacked) while keeping all other nodes operational. Accordingly, the system 50 can prevent malicious code (e.g., a computer virus) from a third party from taking off-line one or more nodes that may be downstream from a node executing unauthorized operations, thereby making the system 50 more resilient to third party attacks.

Figure 2:
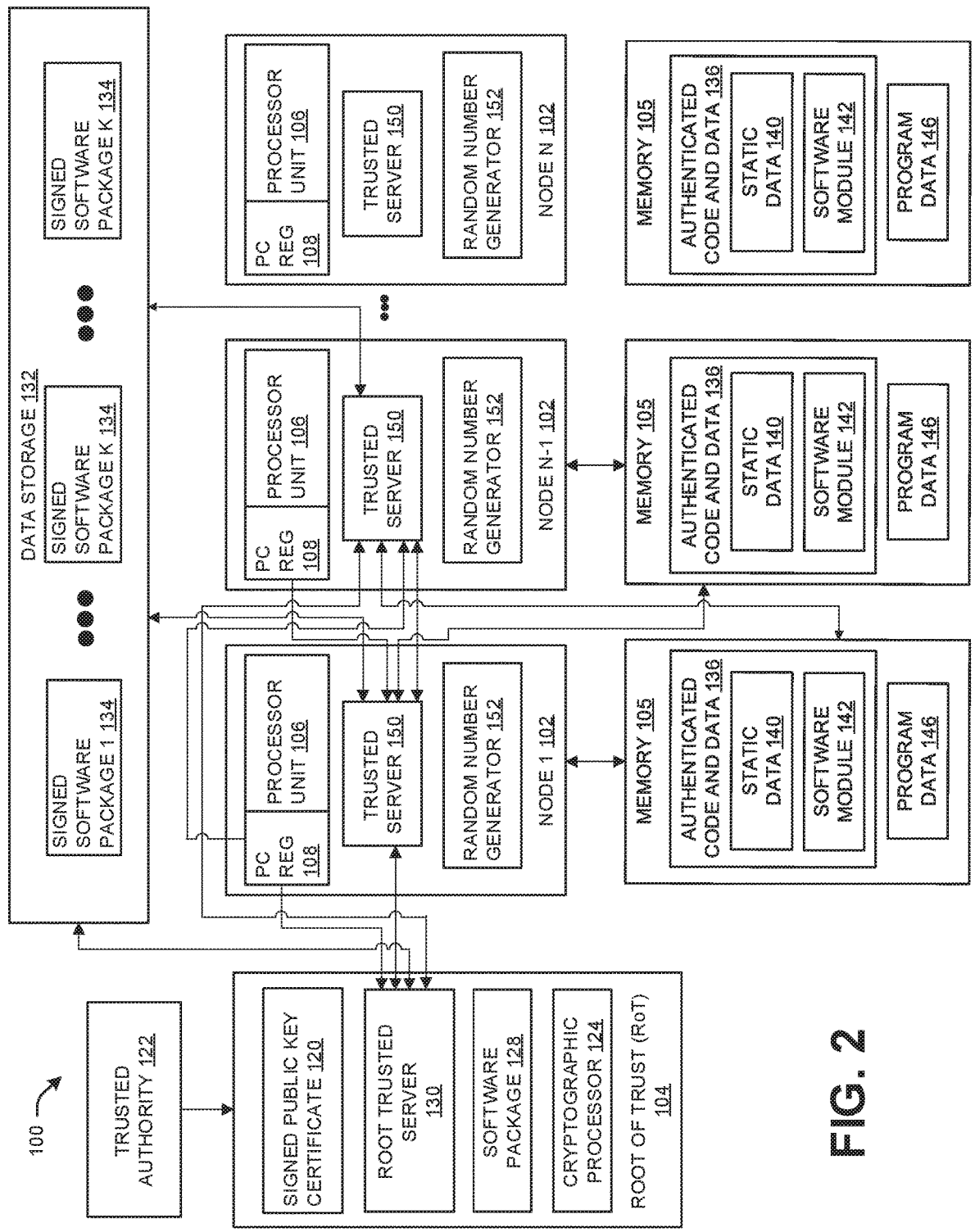
FIG. 2 illustrates another example of a system for establishing and maintaining a bi-directional chain of trust in a computing environment.

FIG. 2 illustrates another example of a system 100 for establishing and maintaining a bi-directional chain of trust between neighboring nodes 102 in a computing environment. The chain of trust can include N number of nodes 102, where N is an integer greater than two, along with a Root of Trust (RoT) 104 from which the chain of trust can initially extend. As an example, the chain of trust in the system 100 can be implemented on a single board computer system, such as a single board computer for a load-balanced system (e.g., an imaging system, a radar system, etc.). Alternatively, the chain of trust in the system 100 can be implemented on a distributed computing system (e.g., a server rack) where each of the nodes 102 can be directly coupled to a neighboring node (e.g., no intervening nodes). Accordingly, each of the nodes 102 can be connected with a data bus, such as a universal serial bus (USB) connection, a parallel data bus connection, a direct network connection, etc. As described herein, neighboring nodes in the system 100 can be configured to monitor a trusted relationship established between the neighboring nodes to ensure that each neighboring node associated with the trusted relationship is executing trusted operations, namely operations that have been authenticated.

Each node 102 can be representative of a computer platform. Thus, each node 102 can be implemented as an instance of hardware capable of executing machine readable instructions. Each node 102 can include memory 105 that can store machine readable instructions and data. Each node 102 in the system 100 can be configured to access the memory 105 of another node 102 to ensure that authenticated code and data and corresponding static data for the other node 102 is unchanged. The memory 105 can be representative of volatile memory, such as random access memory (RAM). In some examples, the memory 105 is a memory device (e.g., a dual-port memory device). Although FIG. 2 illustrates an example wherein each node 102 has respective associated memory 105, in others examples, each of the nodes 102 can be associated with a given memory that is common to each of the nodes 102. In other examples, other types of memory can be used.

Each node 102 can include a processor unit 106 that can access the memory 105 and executes the machine readable instructions. The processor unit 106 can be implemented as a processor core that has an associated program counter (PC) register 108 (labeled in FIG. 2 as "PC REG."). In some examples, a subset (or all) of the N number of nodes 102 can be implemented on a single multi-core processor chip. In other examples, each of the N number of nodes 102 can be implemented as separate computing devices. The PC register 108 of each processor unit 106 can store an address of a next instruction that is to be executed by the corresponding processor unit 106. That is, the PC register 108 can "point to" the next instruction to be executed by the corresponding processor unit 106. In some examples, the program counter register 108 can be referred to as an instruction pointer (IP), instruction address register (IAR), an instruction counter (IC) or an instruction sequencer (IS).

The Root of Trust (RoT) 104 can be implemented as an IC chip, such as an Application Specific Integrated Circuit (ASIC) chip, a Field Programmable Gate Array (FPGA), etc. The RoT 104 can include an embedded signed public key certificate 120. The signed public key certificate 120 can be issued by a trusted authority 122 that securely stores a private key of an asymmetric encryption key pair. The signed public key certificate 120 can include a public key of the asymmetric encryption key pair. In this manner, the public key of the signed public key certificate 120 can be employable to decrypt data encrypted with the private key of the trusted authority 122. The signed public key certificate 120 can include a digital signature of the trusted authority 122. The digital signature can include a hash of a public key that has been encrypted with the private key of the trusted authority 122 (also referred to as a message digest), as well as a copy of the (unencrypted) public key and information identifying the hash function (e.g., a name of a standard hash function) in unencrypted form.

The RoT 104 can include a cryptographic processor 124. The cryptographic processor 124 can decrypt the encrypted hash of the public key and execute the hash function on the (unencrypted) public key. The decrypted hash of the public key can be compared to the results of the hash function on the public key to authenticate the signed public key certificate 120. The RoT 104 can include an embedded software package 128 with machine readable instructions for a root trusted server 130. The embedded software package 128 can be been signed (e.g., a hash of the plaintext package has been encrypted with a private key) by the trusted authority 122 using the hash function in the signed public key certificate 120 or a different hash function, and the results of the hash function can be encrypted with the private key of the trusted authority 122.

Upon boot-up and/or reset, the RoT 104 can execute a sequence of actions to establish the chain of trust on the system 100. The chain of trust can be extended from the RoT 104 to a first node 102 (labeled in FIG. 2 as "NODE 1"). During the boot-up sequence, in some examples, the RoT 104 can employ the cryptographic processor 124 to decrypt the encrypted hash of the software package 128 (forming a decrypted hash of the software package 128), execute the same hash function on the software package 128 and compare the results of the hash produced independently by the RoT 104 to the decrypted hash of the software package 128. If the results of the hash of the software package 128 match the results of the decrypted hash of the software package 128, the RoT 104 can verify the authenticity and integrity of the software package 128. That is, the RoT 104 can employ the hash function associated with the signed public key certificate 120 and the digital signature of the software package 128 to ensure that the software package 128 has been verified as having originated from the trusted authority 122 (e.g., verify authenticity) and that the software package 128 has not been modified (e.g., by a malicious computer application and/or a malicious user) since the software package 128 was signed by the trusted authority 122 (e.g., verify integrity). In other examples, additional and/or alternative authentication techniques can be employed to authenticate the software package 128. Continuing with the boot-up sequence, in response to verifying the authenticity and integrity of the software package 128, the cryptographic processor 124 can execute the root trusted server 130. Upon execution, the boot-up sequence of the RoT 104 is completed.

In some examples, the RoT 104 can employ the cryptographic processor 124 to authenticate subordinate certificates that are generated by an authorized entity (e.g., at a secure facility). More particularly each subordinate certificate can be authenticated by the signed public key certificate 120, and (after authentication) the subordinate certificate can be employed to authenticate a software package assigned to a node in the chain of trust.

In some examples, in response to completion of the boot-up, the root trusted server 130 can execute a trust initialization operation to extend the chain of trust to the first node 102. In some examples, in execution of the trust initialization operation, the root trusted server 130 can set the first node 102 to reset to prevent the first node 102 from executing code. Additionally, the root trusted server 130 can access a data storage 132 and locate (e.g., receive or retrieve) one of K number of signed software packages 134 assigned to the first node 102, where K is an integer greater than or equal to one. In some examples, the same signed software package 134 can be employed on multiple nodes 102. In other examples, each node 102 can be assigned a different signed software package 134 or multiple signed software packages 134. Each of the K number of the signed software packages 134 can be digitally signed by the trusted authority 122. In some examples, the signed software package 134 can include an application launcher that can be launched in response to an activation signal. Inclusion of the application launcher can avoid the need to reset the first node 102.

The data storage 132 can be implemented as non-volatile data storage, such as a hard disk drive, a solid state drive, flash memory, etc. Additionally, although the data storage 132 is illustrated as being external to the N number of nodes 102, in some examples, the data storage 132 can be implemented as multiple instances of data storage that are local to each node 102. In other examples, the data storage 132 can be a shared data repository, such as network-attached storage (NAS).

Figure 3:
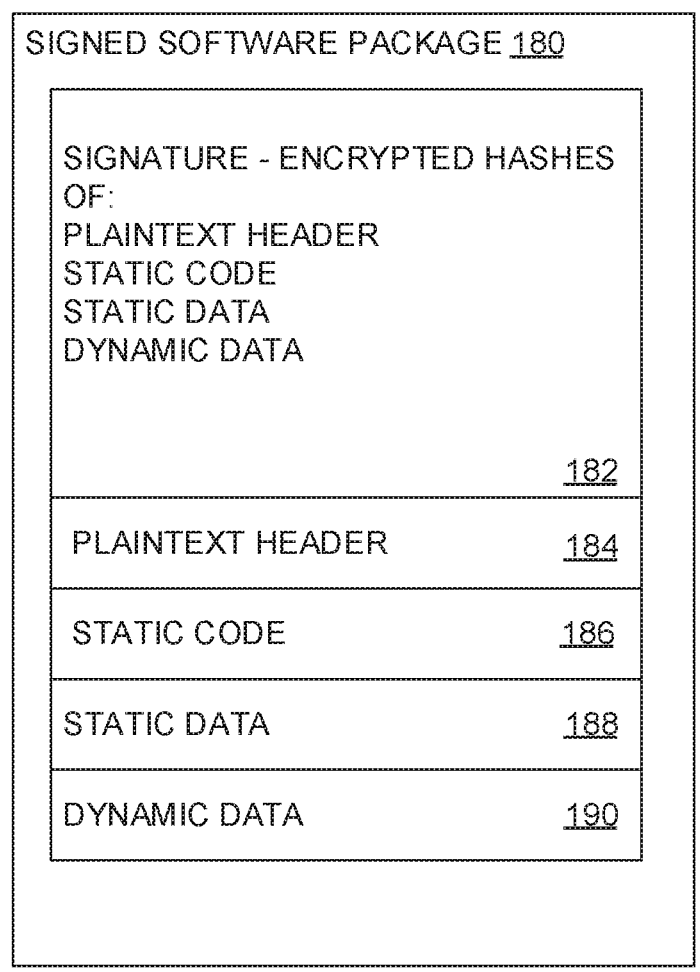
FIG. 3 illustrates an example of a structure of a software module employable to establish and maintain a bi-directional chain of trust in a computing environment.

FIG. 3 illustrates an example of a parts (partitions) of a signed software package 180 that can be employable as an example instance of the K number of signed software packages 134 (including the signed software package 134 assigned to the first node 102). The signed software package 180 can include a signature part 182, a plaintext header part 184, a static code part 186, a static data part 188 and a dynamic data part 190. The signature part 182 can include data for verifying a digital signature of the signed software package 180, or some portion thereof. More particularly, the signature part 182 can include an encrypted hash (using the private key of the trusted authority 122 of FIG. 2) of: the plaintext header part 184, the static code part 186, static data part 188 and the dynamic data part 190. Additionally, in some examples, the signature part 182 can include an encrypted hash of a memory address range of the static code part 186 loaded into a memory of a computing platform (e.g., in a "pristine copy"), as verified by the trusted authority 122.

The plaintext header part 184 can include data that defines a size and position of each of the static code part 186, the static data part 188 and the dynamic data part 190. The static code part 186 can include machine executable instructions for the signed software package 180. The static data part 188 can include data needed by the machine executable instructions in the static code part 186. The dynamic data part 190 can include a dynamic portion of data that is needed by the machine executable instructions in the static code, and such data is modifiable. It is noted that in some examples, some parts of the software module may be omitted. For instance, in some examples, the static data part 188 and/or the dynamic data part 190 may be omitted.

Referring back to FIG. 2, continuing with the trust initialization operation, in response to locating the signed software package 134 assigned to the first node 102, the root trusted server 130 can authenticate the signed software package 134 using the digital signature embedded in the signed software package 134 (e.g., one or more of the encrypted hashes of the signature part 182 of FIG. 3) of the trusted authority 122 and the signed public key certificate 120 to verify the authenticity and integrity of the signed software package 134. Additionally, the root trusted server 130 can store the digital signature (e.g., the signature part 182 illustrated in FIG. 3) and/or a pristine hash of the signed software package 134 for later re-authentication and re-verification.

Continuing with the trust initialization operation, upon authenticating the signed software package 134, the root trusted server 130 can push the authenticated software package 134 into the memory 105 of the first node 102, where the software package can reside as authenticated code and data 136. As noted, the term "pushes" (and its derivatives) indicates that an external node (e.g., the root trusted server 130 of the RoT 104 in the present example) executes or causes execution of a write to a memory (e.g., the memory 105) of another node (e.g., the first node 102).

The authenticated code and data 136 can include static code corresponding to the signed software package 134 assigned to the first node 102. Thus, the authenticated code and data 136 can correspond to portions of the signed software package 180 of FIG. 3 that contribute to trust initialization, including but not limited to the static code 186 of the signed software package 180 of FIG. 3. Moreover, the static data can correspond to the static data 188 of the signed software package 180 of FIG. 3. In some examples, the authenticated code and data 136 can include static data 140 that can include (or be associated with) a trusted software module 142. The trusted software module 142 can include, for example, a boot code (e.g., a Basic Input Output System (BIOS), Coreboot, u-boot, etc.) that can load an operating system (OS) and/or application software for the associated node 102 (e.g., the first node 102). Continuing with the trust initialization operation, upon pushing the authenticated code and data 136 into the memory 105 of the first node 102, the root trusted server 130 can record the memory address range of the static portion of the authenticated code and data 136 (including the memory address range of the trusted software module 140) and corresponding static data 140 in the first node 102. In some examples, during the trust initialization operation, the root trusted server 130 can apply the hash function on the stored memory address range and decrypt a stored encrypted hash of the memory address range (e.g., included in the signature part 182 of the signed software package 180 of FIG. 3).

The hash of the memory address range and the decrypted hash of the memory address range can be compared by the root trusted server 130 to ensure that the authenticated code 136 of the first node 102 is properly stored in the memory 105 of the first node 102. Additionally, in the trust initialization operation, upon pushing the authenticated code 136 into the memory 105 of the first node 102, the root trusted server 130 can re-authenticate the authenticated code 136 using the stored digital signature for the signed software package 134. As an example, the root trusted server 130 can re-authenticate the authenticated code 136 using the encrypted hash of static code (e.g., stored in the signature part 182 of the signed software package 180 of FIG. 3) corresponding to the authenticated code 136 to re-authenticate the authenticated code 136.

Continuing with the trust initialization operation, upon recording the memory address range of the authenticated code and data 136 and re-authenticating the authenticated code and data 136, the trusted relationship can be finalized between the root trusted server 130 of the RoT 104 and the first node 102. In some examples, to finalize the trusted relationship, the root trusted server 130 can release the first node 102 from reset. This release can allow the first node 102 to boot and execute the machine readable instructions loaded in the memory 105 to finalize the trusted relationship between the root trusted server 130 and the first node 102, such that the first node 102 starts-up as a "trusted client" of the root trusted server 130. Alternatively, to finalize the trusted relationship, the root trusted server 130 can provide an activation signal that can cause the first node 102 to execute the machine instructions loaded in the memory 105. In either situation, the root trusted server 130 can cause the first node 102 to execute authenticated code and data 136 in response to the pushing to finalize the trusted relationship between the RoT 104 and the first node 102. Upon finalizing the trusted relationship, the trusted relationship is established and the trust initialization operation is completed. It is noted that the trusted relationship is established upon executing each action of the trusted initialization operation. That is, if an action of the trusted initialization operation is unable to complete successfully (such as a failed authentication), the trusted relationship is not established between the RoT 104 and the first node 102.

The root trusted server 130 can switch to a trust maintenance operation to monitor code being executed by the first node 102. In the trust maintenance operation, the root trusted server 130 can monitor operations of the first node 102 to ensure that the first node 102 is only executing trusted operations. For example, to monitor the code being executed by the first node 102, the root trusted server 130 can monitor the authenticated code and data 136 to re-verify the trusted software module 142. Additionally, to monitor the code being executed by the first node 102, the root trusted server 130 can monitor values of the memory addresses stored in the PC register 108 of the first node 102. These monitors (e.g., of the authenticated code and data 136 and the value in the PC register 108) can be continuous, periodic and/or asynchronous. As long as the trusted software module 142 can be re-verified and the value in the PC register 108 can be recorded by the root trusted server 130 for the trusted software module 142 (e.g., corresponding to the static code 186 and the static data 188), the root trusted server 130 can be assured that the node 102 is still operating as a trusted client of the root trusted server 130, such that the first node 102 is only executing authenticated software, which can be referred to as "trusted operations".

Further, during execution by the first node 102, the trusted software module 142 can manipulate program data 146 (e.g., generate, modify and/or delete data). Such program data 146 can correspond to the dynamic data part 190 of FIG. 3. The root trusted server 130 does not need to monitor this manipulation of the program data 146 in order to maintain the trusted relationship between the root trusted server 130 and the trusted client (e.g., the first node 102). That is, the root trusted server 130 can ignore the program data 146 (dynamic data) and maintain the trusted relationship with the first node 102.

In further examples, the root trusted server 130 can establish a trusted relationship with the second node 102 in a same or similar manner as the root trusted server 130 established the trusted relationship with the first node 102. To maintain the trusted relationship established between the root trusted server 130 and the second node 102, the root trusted server 130 can monitor the authenticity and integrity of a static portion of a trusted software module 142 operating on the second node 102. For example, periodically, continuously and/or asynchronously the root trusted server 130 can re-verify the authenticated code and data 136 and the corresponding static data 140 of the second node 102 in the memory 105 of the second node 102, and a value stored in the PC register 108 of the second node 102 to ensure that the second node 102 is only executing operations in the memory address range recorded for the static portion of the authenticated code and data 136 and that the corresponding static data 140 is unchanged. Accordingly, the root trusted server 130 can be assured that the second node 102 is only executing trusted operations and that the authenticated code 136 and the corresponding static data 140 in the memory 105 of the second node 102 is unchanged.

In some examples, the first node 102 can include a trusted server 150. The trusted server 150 of the first node 102 can be initialized (e.g., activated) in response to the root trusted server 130 releasing the first node 102 from reset to allow the first node 102 to boot and execute the machine code for the trusted software module 140. The trusted server 150 of the first node 102 can be initialized such that the first node 102 is provided as a combination of a trusted client and a trusted server or elevated from a trusted client to a combination of a trusted client and a trusted server, thereby extending the chain of trust in the system 100. In an example, the trusted server 150 of the first node 102 can be configured as a memory controller (e.g., as a hardware element, a software element or a combination thereof). In some examples, the trusted server 150 of the first node 102 can be configured with respect to the second node 102 such that the trusted server 150 of the first node 102 can function as a memory controller for the second node 102, thereby controlling access (e.g., flow of data) by the processor unit 106 of the second node 102 to the memory 105 of the second node 102. In some examples, the memory 105 of the second node 102 is a multi-port memory device. In these examples, the processor unit 106 of the second node 102 can access the multi-port memory device without going through the trusted server 150 of the first node 102. Accordingly, the trusted server 150 of the first node 102 can be granted access to the memory 105 of the second node 102 to ensure that the second node 102 is executing only trusted operations, namely operations that have been authenticated.

In some examples, the trusted server 150 can include a copy of the signed public key certificate 120 or a subordinate certificate that can be authenticated by the public key certificate 120. In operation, the trusted server 150 of the first node 102 can execute a trust initialization operation to establish a trusted relationship with the second node 102 (e.g., labeled in FIG. 2 as "NODE N−1") in a same or similar manner as the root trusted server 130 established the trusted relationship with the first node 102. To execute the trust initialization operation, the trusted server 150 of the first node 102 can authenticate the signed public key certificate 120 (or a subordinate certificate), which can be embedded in or external to the trusted server 150.

Continuing with the trust initialization operation, in some examples, the trusted server 150 of the first node 102 can reset the second node 102 and hold the second node 102 in reset to prevent the second node 102 from executing instructions. Continuing with the trust initialization operation, before the second node 102 is released from reset, the trusted server 150 of the first node 102 can access the data storage 132 to locate one of the K number of signed software packages 134 assigned to the second node 102. The signed software package 134 assigned to the second node 102 can be implemented in a manner corresponding to the signed software package 180 of FIG. 3. The trusted server 150 of the first node 102 can authenticate the signed software package 134 and store a signature of the signed software package 134 for re-verification (e.g., the signature part 182 of the signed software package 180 of FIG. 3). In some examples, the signed software package 134 can include an application launcher that can be launched in response to an activation signal. Inclusion of the application launcher can avoid the need to reset the second node 102.

Continuing with the trust initialization operation, the trusted server 150 of the first node 102 can push the authenticated software package 134 into the memory 105 of the second node 102 to form authenticated code and data 136 in the second node 102. Continuing with the trust initialization operation, a memory address range of the authenticated code and data 136 of the second node 102 can be stored by the trusted server 150 of the first node 102 for subsequent authentication and/or monitoring. In some examples, the trusted server 150 can execute a hash on the stored memory address range of the second node 102 and decrypt an encrypted hash of a memory address range for static code and corresponding static data 140 of the authenticated software package 134 (e.g., included in the signature part 182 of the signed software package 180 of FIG. 3). The results of the hash of the memory address range and the decrypted hash of the memory address range can be compared by the trusted server 150 of the first node 102 to ensure that the authenticated code and data 136 of the second node 102 is properly stored in the memory 105 of the second node 102.

Further, continuing with the trust initialization operation, the trusted server 150 of the first node 102 can re-authenticate the authenticated code and data 136 in the memory 105 of the second node 102. To re-authenticate the code and data 136, the trusted server 150 of the first node 102 can execute a hash on the authenticated code and data 136, which corresponds to static code (e.g., the static code part 186 illustrated in FIG. 3), and the corresponding static data 140. Thus, the trusted server 150 of the first node 102 can decrypt an encrypted hash of the static code included in a signature part (e.g., the signature part 182 illustrated in FIG. 3) and compare the decrypted hash of the static code with the results of the hash on the authenticated code and data 136 to re-authenticate the authenticated code 136.

Continuing with the trust initialization operation, upon storing the memory address range of the authenticated code and data 136 of the second node 102 and re-authenticating the authenticated code and data 136, the trusted relationship can be finalized with the second (next) node 102. In some examples, to finalize the trusted relationship, the trusted server 150 of the first node 102 can release the second node 102 from reset, allowing execution of trusted operations (machine executable code within the recorded memory address range), such that the second node 102 starts-up as a trusted client for the trusted server 150 of the first node 102. Upon finalizing the trusted relationship, the trusted relationship is established and the trust initialization operation is completed. It is noted that the trusted relationship is established upon executing each action of the trusted initialization operation. That is, if an action of the trusted initialization operation is unable to complete successfully (such as a failed authentication), the trusted relationship is not established between the first node 102 and the second node 102. Alternatively, to finalize the trusted relationship, the trusted server 150 of the first node 102 can provide an activation signal causing the second node 102 to execute the machine instructions loaded in the memory 105. Accordingly, the trusted server 150 of the first node 102 can cause the second node 102 to execute authenticated code in response to the pushing to finalize the trusted relationship between the trusted server 150 of the first node 102 and the second node 102.

The trusted server 150 of the first node 102 can switch to a trust maintenance operation in response to finalizing the trusted relationship with the second node 102. In the trust maintenance operation, trusted server 150 of the first node 102 can monitor the authenticated code and data 136 and the PC register 108 of the second node 102 in a same or similar manner, as the root trusted server 130 monitors the first node 102. In this manner, the trusted server 150 of the first node 102 can be assured that the second node 102 is only executing trusted operations. Moreover, similar to the trusted software module 142 of the first node 102, program data 146 (e.g., dynamic data) manipulated by the trusted software module 142 of the second node 102 does not need to be monitored or authenticated by the trusted server 150 of the first node 102 to maintain the trusted relationship.

In some examples, the second node 102 can include a trusted server 150. The trusted server 150 of the second node 102 can be initialized in response to the trusted server 150 of the first node 102 releasing the second node 102 from reset to allow the second node 102 to boot and execute the machine code for the trusted software module 142. The trusted server 150 of the second node 102 can be initialized such that the second node is 102 is provided as a combination of a trusted client and a trusted server or elevated from a trusted client to a combination of a trusted client and a trusted server, thereby extending the chain of trust in the system 100. The trusted server 150 of the second node 102 can operate in a same or similar manner as the trusted server 150 of the first node 102 and maintain the trusted relationship established between the first node 102 and the second node 102. In additional examples, the trusted server 150 of the second node 102 can be configured to access a memory 105 of a third node 102 to ensure that authenticated code and data 136 and corresponding static data 140 in the memory 105 of the third node 102 is unchanged, as described herein. Accordingly, a trusted server of a given node can be configured to access a memory of one or more other nodes in the system 100 to ensure an authenticated code and corresponding static data in the memory of the one or more other nodes is unchanged.

In some examples, the trusted server 150 of the second node 102 can monitor the authenticity and integrity of the static portion of the trusted software module 142 operating on the first node 102 to maintain the trusted relationship between the first and second nodes 102. For example, periodically, continuously and/or asynchronously the trusted server 150 of the second node 102 can re-verify the authenticated code and data 136 and the corresponding static data 140 in the memory 105 of the first node 102. In some examples, the trusted server 150 of the second node 102 can locate (e.g., receive or retrieve) the previously stored hash of the authenticated code and data 136 and the corresponding static data 140 in the memory 105 of the first node 102. The trusted server 150 of the second node 102 can execute a hash on the authenticated code and data 136 and the corresponding static data 140 in the memory 105 of the first node 102 and compare the hash to the previously stored hash (e.g., a "pristine hash") of the authenticated code and data 136 and the corresponding static data 140 to re-verify the authenticated code and data 136 and the corresponding static data 140 in the memory 105 of the first node 102.

In some examples, the trusted server 150 of the second node 102 can locate (e.g., receive or retrieve) a recorded memory address range for the static portion of the authenticated code and data 136 and the corresponding static data 140 that can include the trusted software module 142. The trusted server 150 of the second node 102 can monitor (e.g., periodically, continuously and/or asynchronously) the value stored in the PC register 108 of the first node 102 to ensure that the first node 102 is only executing operations in the memory address range recorded for the static portion of the authenticated code and data 136. In response to the trusted server 150 of the second node 102 verifying the authenticity and the integrity of the authenticated code and data 136 and the corresponding static data 140 in the memory 105 of the first node 102, and that the PC register 108 of the first node 102 only stores addresses within the memory address range recorded for the static portion of the authenticated code and data 136, the trusted server 150 of the second node 102 can be assured that the first node 102 is only executing trusted operations and that the authenticated code and data 136 and the corresponding static data 140 in the memory 105 of the first node 102 is unchanged.

Accordingly, by granting the trusted server 150 of the second node 102 access to the memory 105 and the PC register 108 of the first node 102, and the trusted server 150 of the first node 102 access to the memory 105 and the PC register 108 of the second node 102, the chain of trust established between the neighboring nodes can be maintained bi-directionally. Neighboring nodes 102 can maintain a trusted relationship established between each other to ensure that each neighboring node 102 is only executing instructions that are stored within the memory address range of respective authenticated code, and ensure that the respective authenticated code and the corresponding data remains unchanged.

In some examples, maintenance of the trusted relationship established between the first node 102 and the second node 102 can be shared with the third node 102 for remote monitoring of the trusted relationship. For example, the trusted server 150 of the second node 102 can share maintenance of the trusted relationship established between the first node 102 and the second node 102 with the third node 102. By sharing a responsibility of the second node 102 with the third node 102 of maintaining the trusted relationship established between the first and second nodes 102, the third node 102 can be employed to ensure that the first node 102 is only executing trusted operations, namely operations that have been authenticated. In some examples, prior to sharing maintenance of the established relationship between the first and second nodes 102 with the third node 102, the trusted server 150 of the second node 102 can establish a trusted relationship with the third node 102. The trusted relationship with the third node 102 can be established in a same or similar manner as the trusted server 150 of the first node 102 established the trusted relationship with the second node 102, as described herein.

Upon establishing the trusted relationship with the third node 102, the trusted server 150 of the second node 102 can provide the copy of the previously stored hash of the authenticated code and data 136 and the corresponding static data 140 in the memory 105 of the first node 102. The third node 102 (e.g., a trusted server 150 of the third node 102) can access the memory 105 of the first node 102 to re-verify the authenticated code and data 136 and the corresponding static data 140 in the memory 105 of the first node 102. For example, the trusted server 150 of the third node 102 can execute a hash on the authenticated code and data 136 and the corresponding static data 140 in the memory 105 of the first node 102 and compare the hash to the previously stored hash (e.g., a "pristine hash") of the authenticated code and data 136 and the corresponding static data 140 to re-verify the authenticated code and data 136 and the corresponding static data 140 in the memory 105 of the first node 102.

In some examples, the trusted server 150 of the third node 102 can locate (e.g., receive or retrieve) a recorded memory address range for the static portion of the authenticated code and data 136 and the corresponding static data 140 that can included (or be associated with) the software module 142 in the memory 105 of the first node 102. The trusted server 150 of the third node 102 can monitor (e.g., periodically, continuously and/or asynchronously) the value stored in the PC register 108 of the first node 102 to ensure that the first node 102 is only executing operations in the memory address range recorded for the static portion of the authenticated code and data 136. In response to the trusted server 150 of the third node 102 verifying the authenticity and the integrity of the authenticated code and data 136 and the corresponding static data 140 in the memory 105 of the first node 102, and that the PC register 108 only stores addresses within the memory address range recorded for the static portion of the authenticated code and data 136, the trusted server 150 of the third node 102 can be assured that the first node 102 is only executing trusted operations and that the corresponding static data 140 in the memory 105 of the first node 102 is unchanged. The trusted server 150 of the third node 102 can communicate with the trusted server 150 of the second node 102 to notify the trusted server 150 of the second node 102 that the first node 102 is executing trusted operations, namely operations that have been authenticated.

In some examples, the first node 102 is not executing trusted operations, such as in examples wherein the first node 102 has been compromised by a third party. Upon determining that the first node 102 is not executing trusted operations, the trusted server 150 of the third node 102 can notify the trusted server 150 of the second node 102. In response, the trusted server 150 of the second node 102 can set the first node 102 in reset and hold the first node 102 in reset. Before the first node 102 is released from reset, the trusted server 150 of the second node 102 can locate (e.g., receive, retrieve, etc.) the signed software package 134 assigned to the first node 102 and authenticate the signed software package 134 to verify the authenticity and integrity of the signed software package 134 in a same or similar manner as the root trusted server 130. The trusted server 150 of the second node 102 can push the authenticated software package 134 into the memory 105 of the first node 102 to reload the authenticated code 136 while the first node 102 is being held in reset. The memory address range of the static portion of the authenticated code and data 136 and corresponding static data 140 in the memory 105 of the first node 102 can be re-recorded (e.g., stored) by the trusted server 150 of the second node 102 for subsequent authentication and/or monitoring.

The trusted server 150 of the second node 102 can re-authenticate the authenticated code and data 136 for the first node 102 after the authenticated code and data 136 is pushed into the memory 105 of the first node 102 in a same or similar manner as the root trusted server 130. Upon storing the memory address range of the authenticated code and data 136 and re-authenticating the authenticated code and data 136 and the corresponding static data 140 for the first node 102, a new trusted relationship can be finalized between the trusted server 150 of the second node 102 and the first node 102. The trusted server 150 of the second node 102 can monitor the new trusted relationship established between the first node 102 and the second node 102. In other examples, the trusted server 150 of the second node 102 can share monitoring of the new trusted relationship established between the first node 102 and the second node 102 with the third node 102 for remote monitoring of the new trusted relationship established between the first and second nodes 102, as described herein.

As mentioned, the trusted server 150 of the second node 102 can operate in a same or similar manner as the trusted server 150 of the first node 102 and can execute a trust initialization operation to establish a trusted relationship between the trusted server 150 of the second node 102 and the third node 102. Upon establishing the trusted relationship with the third node 102, the trusted server 150 of the second node 102 can switch to a trust maintenance operation and monitor an authenticated code and data 136 and corresponding static data 140 and a PC register 108 of the third node 102 to verify that the third node 102 is only executing trusted operations and to ensure that the authenticated code and data 136 and corresponding static data 140 is unchanged. In some examples, the trusted server 150 of the third node 102 can be configured to operate in a same or similar manner as the trusted server 150 of the second node 102.

The trusted server 150 of the third node 102 can monitor the authenticity and integrity of the static portion of the trusted software module 142 operating on the second node 102 in a same or similar manner as the trusted server 150 of the second node 102 to maintain the trusted relationship between the second node 102 and the third node 102. In some examples, wherein the third node 102 is a neighboring node of the first node 102, and a trusted relationship has been established between the first node 102 and the third node 102, as described herein, the trusted server 150 of the third node 102 can monitor the authenticity and integrity of the static portion of the trusted software module 142 operating on the first node 102 in a same or similar manner as the second node 102 to maintain the trusted relationship established between the first node 102 and the third node 102. Accordingly, in some examples, the third node 102 can monitor both the first and second nodes 102 to ensure that each node 102 is executing only trusted operations, namely operations that have been authenticated.

As noted, the root trusted server 130 can extend trust to one or more neighboring nodes 102. One of the neighboring nodes 102, or both, can extend the trust to one or more other neighboring nodes 102 in the system 100. Each of the nodes 102 in the system 100 can be configured to monitor an established trusted relationship with another node 102 that is configured to monitor the established trusted relationship to provide for bi-directional monitoring of the established trusted relationship, and thereby ensure that each node 102 is executing only trusted operations, namely operations that have been authenticated.

Accordingly, by employment of the system 100, a chain of trust can be extended from the RoT 104 and among neighboring nodes 102 of the system 100 such that a bi-directional chain of trust is established between the neighboring nodes 102. By employing a bi-directional verification of trust between neighboring nodes 102 can ensure that attacks by a third party only bring down a given node (e.g., the first node 102) and not any other nodes (e.g., the second node 102) that the given node was responsible for maintaining an established trusted relationship. As such, the system 100 can minimize the impact of third party attacks on the system 100 by taking off-line only the node that is under attack (or has been attacked) while keeping all other nodes operational. Accordingly, the system 100 can prevent malicious code (e.g., a computer virus) from a third party from taking off-line one or more nodes that may be downstream from a node executing unauthorized operations, thereby making the system 100 more resilient to third party attacks.

As an example, if the trusted software module 142 operating on the second node 102 is modified (e.g., by the third party) and/or moved to a different memory address, such modification and/or movement would change a hash of the (previously) authenticated code and data 136 such that the trusted server 150 of the third node 102 would not be able to re-verify the authenticity and integrity of the trusted software module 142 of the second node 102. The trusted server 150 of the third node 102 can detect the possibility that a non-trusted operation is being executed on the second node 102. Additionally, or alternatively, such a modification may cause the associated PC register 108 of the second node 102 to point to an address range outside the range designated for the static portion of the authenticated code, which can cause trusted server 150 of the third node 102 to detect the possibility that a non-trusted operation is being executed on the second node 102. For instance, if the trusted server 150 of the third node 102 detects a failed re-verification of the trusted software module 142 of the second node 102 and/or detects that a value in the PC register 108 of the second node 102 is outside the memory address range recorded for the static portion of the authenticated code and data 136 of the second node 102, the trusted server 150 of the third node 102 can detect the possibility of a non-trusted operation being executed at the second node 102.

In response to detecting a possibility of a non-trusted operation being executed at the second node 102, the trusted server 150 of the third node 102 can the reset the second node 102 and re-execute the trust initialization operation and the trust maintenance operation in a same or similar manner as described herein. In other examples, the chain of trust can be re-established by the first node 102 in a same or similar manner as described herein. In some examples, the trusted server 150 of the third node 102 (or the first node 102) can generate a report characterizing the detected possible non-trusted operation and send the report to an external system.

In some examples, the RoT 104 and each of the nodes 102 can be coupled via a data interface. The data interface can be employed to communicate data (e.g., messages) among the RoT and the nodes 102. In an example, the RoT 104 and each of the nodes 102 can be configured to employ the data interface and communicate according to an authentication protocol to confirm an operational state of a given node 102. In some examples, the data interface can be representative of a communication system, such as a computer bus. In some examples, wherein the trusted server 150 of the second node 102 shares maintenance of the trusted relationship established between the first node 102 and the second node 102 with the third node 102, as described herein, the second node 102 may employ the data interface to communicate maintenance information to the third node 102. The maintenance information can include the copy of the previously stored hash of the authenticated code and data 136 and the corresponding static data 140 in the memory 105 of the first node 102.

In some examples, the maintenance information can include the recorded memory address range for the static portion of the authenticated code and data 136 and corresponding static data 140 in the memory of the first node 102. In further examples, each of the nodes 102 may employ the data interface to communicate status information for one or more neighboring nodes 102. The status information can include information on whether the one or more neighboring nodes 102 have been compromised, operational parameters of the one or more neighboring nodes 102, and/or an operation state of the one or more neighboring nodes 102. Accordingly, the RoT 104 can be configured to receive status information for each of the nodes 102 in the system 100.

As noted, the RoT 104 and each of the nodes 102 can be configured to communicate according to an authentication protocol to confirm an operational state of a given node 102. In an example, the authentication protocol can be a challenge-response authentication protocol and can be used to confirm that a processor of the given node is operating normally, that is, not in a hang (or freeze) state. The hang (or freeze) state can correspond to a processor state wherein the processor is experiencing a hardware and/or software defect. Some or all of the nodes 102, including the RoT 104, can be configured to periodically communicate with one or more other nodes 102 to confirm that a corresponding processor of the one or more nodes is not malfunctioning (e.g., in a hang state).

In some examples, each node 102 can include a random number generator 152. In further examples, the RoT 104 can include a random number generator 152 as well (not shown in FIG. 2). The random number generator 152 can be configured to generate an arbitrary number (e.g., a nonce) that can be used in a communication session with another node, such as the second node 102. The first node 102 can encrypt the arbitrary number according to a private key for the first node 102 to generate an encrypted message that includes the arbitrary number. The first node 102 can communicate via the data interface a challenge message that can include the encrypted arbitrary number to the second node 102.

The second node 102 can decrypt the encrypted arbitrary number according to a public key for the first node 102 to recover the arbitrary number. In response, the second node 102 can be configured to encrypt the decrypted arbitrary number and, in some examples additional data, according to a private key for the second node 102 to generate an encrypted message. The second node 102 can communicate via the data interface a response message that can include the encrypted arbitrary number and the additional data to the first node 102. The first node 102 can decrypt the response message according to the public key for the second node 102 to recover the arbitrary number and the additional data. In response to recovering the arbitrary number, the first node 102 can be assured that the second node 102 is not malfunctioning (e.g., in a hang state). In some examples, the first node 102 may confirm that the processor 106 of the second node 102 is not in the hang state prior to establishing the trusted relationship with the second node 102.

In some examples, the first node 102 may not receive the response message (e.g., after a given amount of time from second node 102 when the challenge message was sent). In response to the first node 102 not receiving the response message, the first node 102 can hold the second node 102 in reset, push a signed software package into the memory 105 of the second node 102 while the second node 102 is in reset to reload the authenticated code in a same or similar manner as described herein. Accordingly, by allowing each node 102 to communicate via the digital interface with other nodes 102 in the system 100, nodes 102 can be configured to communicate with one or more others nodes 102 (e.g., periodically or asynchronously) to confirm that the nodes 102 are operating within normal operating conditions (e.g., not in a hang state). As such, malfunctioning nodes can be detected more effectively and efficiently in the system 100 by employing the digital interface to communicate with other nodes to confirm that the other nodes are operating normally. In addition, by employing cryptographic techniques to protect information (e.g., messages) being transmitted between nodes protects the system 100 against man-in-the-middle attacks (e.g., eavesdroppers) and subsequent replay attacks.

Accordingly, by employment of the system 100, the chain of trust can be extended from the RoT 104 to each of the nodes 102. Each node 102 in the system 100 can access the memory 105 of the other node 102 to ensure that each node 102 is executing only trusted operations, namely operations that have been authenticated. By granting each node 102 access to the memory 105 and PC registers 108 of neighboring nodes 102 can ensure that attacks by a third party only bring down a given node (e.g., the first node 102) and not any other nodes (e.g., the second node 102) that the given node was responsible for maintaining an established trusted relationship. As such, the system 100 can minimize the impact of third party attacks on the system 100 by taking off-line only the node that is under attack (or has been attacked) while keeping all other nodes operational. Accordingly, the system 100 can prevent malicious code (e.g., a computer virus) from a third party from taking off-line one or more nodes that may be downstream from a node executing unauthorized operations, thereby making the system 100 more resilient to third party attacks.

Figure 4:
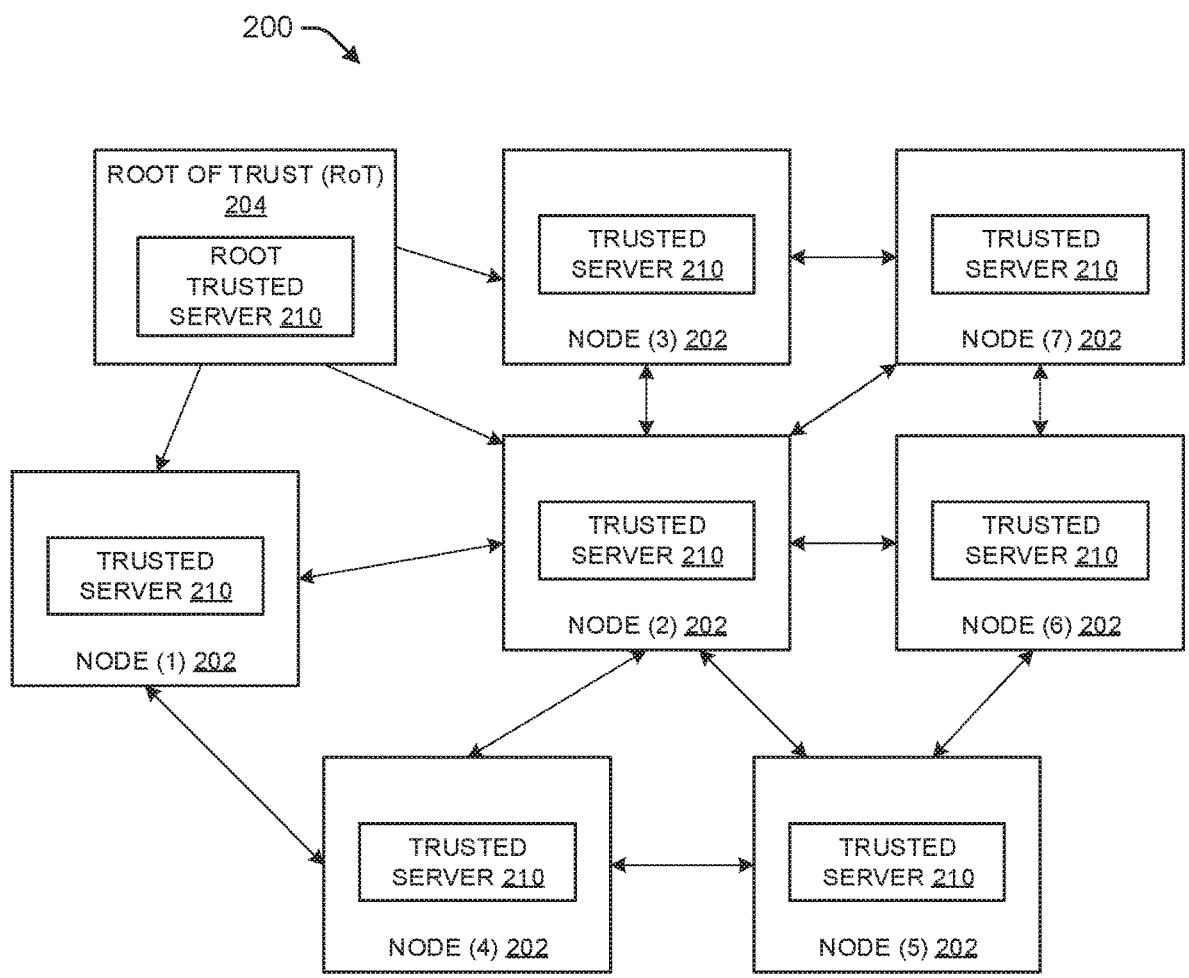
FIG. 4 illustrates an example of system with a web chain of trust network.

FIG. 4 illustrates a diagram of a system 200 for establishing a web chain of trust among nodes 202 extended from a Root of Trust (RoT) 204, such that a chain of trusted established between neighboring nodes can be monitored bi-directionally. Each node 202 can be implemented in a manner similar to a node, as illustrated in FIGS. 1 and/or 2, and the RoT 204 can be implemented in a manner similar to a RoT, as illustrated in FIGS. 1 and/or 2. For purposes of simplification of explanation, it is presumed that in the system 200, the chain of trust has been established and maintained in the manner described herein (such as with respect to FIGS. 1 and/or 2).

Each node 202 in the system 200 can be configured to access a memory and a PC register of one or more neighboring nodes and ensure that the one or more neighboring nodes are executing trusted operations, namely operations that have been authenticated, as described herein. In response to a given node (e.g., node (6) 202), as illustrated in the example of FIG. 4) detecting a possibility of a non-trusted operation being executed at another node (e.g., node (2) 202, as illustrated in the example of FIG. 4), the given node can hold the other node in reset and thereby isolate the other node from surrounding nodes (e.g., the RoT 204, node (1) 202, node (3) 202, node (4), 202, node (5) 202, node (6) 202, and node (7), as illustrated in the example of FIG. 4). As such, no chain of trust would be extended to the other node as a result.

As mentioned, the given node can hold the other node in reset and execute a trust initialization operation to establish a trusted relationship with the other node, as described herein. For example, to re-establish the chain of trust with the other node, a trusted server of the given node (e.g., the trusted server 210 of the node (6) 202, as illustrated in the example of FIG. 4) that detected the possible non-trusted operation on the other node can reset the other node and re-execute the trust initialization operation and the trust maintenance operation in a same or similar manner as described herein. In some examples, the given node can verify that the other node has been compromised before executing the trust initialization operations to re-establish a chain of trust with the other node. For example, if a given node (e.g., node (1) 202) gets a message from a second node (e.g., node (2) 202) that another node (e.g., node (5) 202) has been compromised, prior to resetting the other node, the given node can confirm that the other node is executing non-trusted operations, as described herein. Accordingly, the system 200 demonstrates the flexibility achievable for the chain of trust described herein. In particular, that a web chain of trust is possible that can result in bidirectional monitoring of an established trust between neighboring nodes. The system 200 is more resilient to third party attacks as a third party attacker would be required to attack (e.g., simultaneously) all the nodes 202 in the system 200 to infiltrate the system 200 without being detected.

Figure 5:
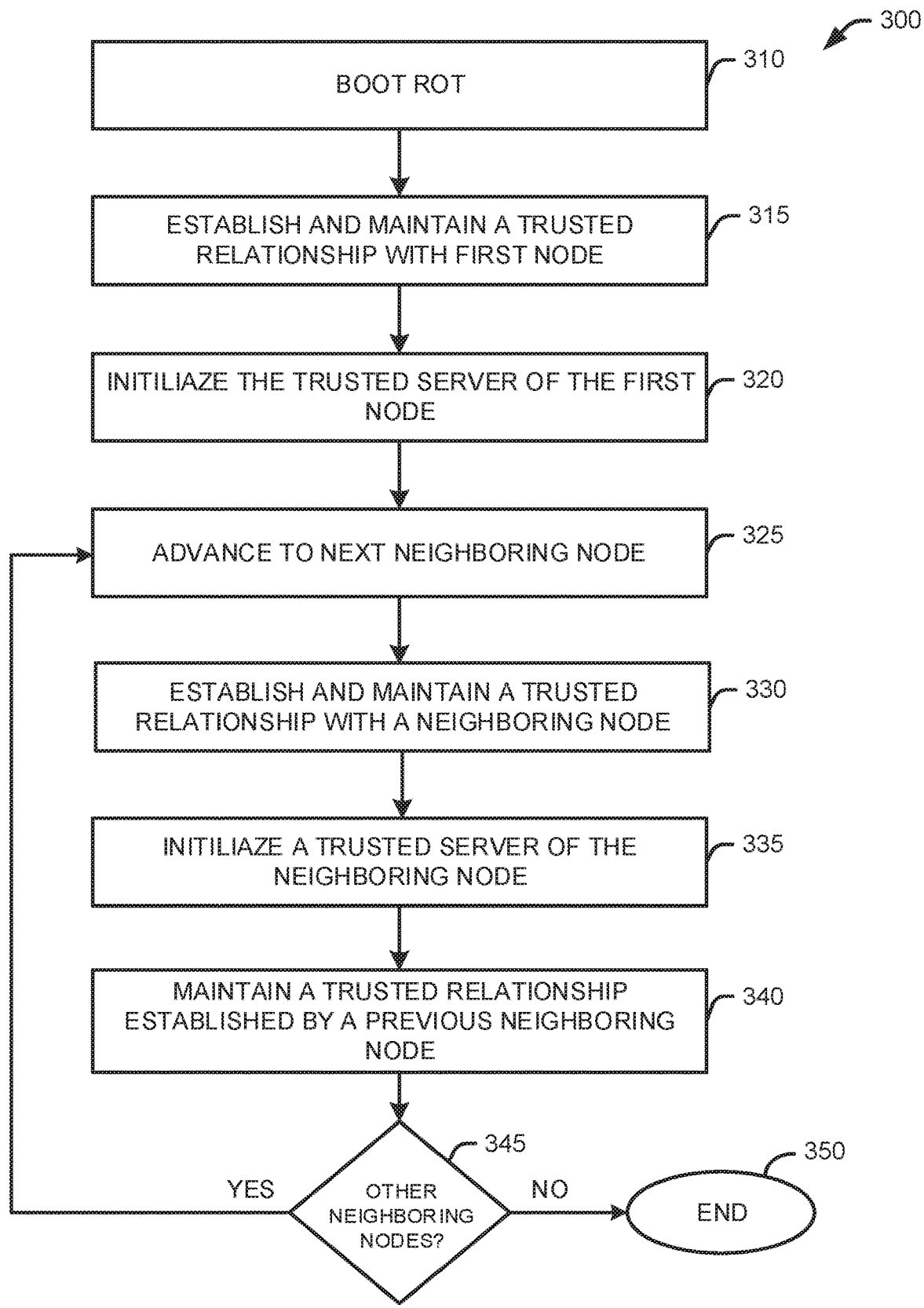
FIG. 5 illustrates an example of a method for establishing and maintaining a bi-directional chain of trust in a computing environment.

FIG. 5 illustrates an example of a method 300 for establishing and maintaining a bi-directional chain of trust between neighboring nodes in a computing environment. The method 300 can be implemented, for example, by the system 50 of FIG. 1, the system 100 of FIG. 2 and/or the system 200 of FIG. 4. At 310, a root of trust (RoT) (e.g., the RoT 104 of FIG. 2) can boot, which causes a root trusted server (e.g., the root trusted server 130 of FIG. 2) to execute on the RoT. At 315, the root trusted server can establish and maintain a trusted relationship with a first node (e.g., the first node 102 of FIG. 2), such that the first node starts-up and operates as a trusted client of the root trusted server. At 320, the root trusted server can initialize a trusted server of the first node.

At 325, the method 300 can advance to a next neighboring node (e.g., the second node 102 in FIG. 2). The trusted server of a previous neighboring node can establish and maintain a trusted relationship with a current neighboring node, such that the current neighboring node starts-up and operates as a trusted client of the trusted server of the previous neighboring node. At 335, the trusted server of the previous neighboring node can initialize a trusted server (e.g., the trusted server 150 of the second node 102 in FIG. 2) of the current neighboring node. At 340, the trusted server of the current neighboring node can maintain the trusted relationship established by the previous neighboring node to provide bi-directional monitoring of the trusted relationship between the previous neighboring node and the current neighboring node. At 345, a determination can be made as to whether one or more other nodes (e.g., the third node 102 in FIG. 2) are connected to the current neighboring node. If the determination at 345 is negative (e.g., NO), the method proceeds to 350. At 350, the method ends. If the determination at 345 is positive (e.g., YES), the method proceeds to 325 for another iteration.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for establishing and maintaining a bi-directional chain of trust comprising:
    a root of trust (RoT) executing a root trusted server that:
        establishes a trusted relationship between the trusted server of the RoT and a given node;
        monitors the given node to ensure that the given node executes trusted operations and to ensure that authenticated code and static data in memory associated with the given node are unchanged;
    wherein the given node comprises a trusted server that:
        pushes authenticated code into memory associated with another node;
        causes the other node to execute the authenticated code in response to the pushing to establish a trusted relationship between the given node and the other node; and
        monitors the other node to ensure that the other node executes trusted operations and to ensure that the authenticated code and static data in the memory associated with the other node are unchanged; and
    wherein the other node comprises a trusted server that:
        monitors the given node to ensure that the given node executes trusted operations and to ensure that the authenticated code and static data in the memory associated with the given node are unchanged based on maintenance information received for the given node, wherein the maintenance information includes one of a copy of a previously stored hash of the authenticated code and static data in the memory associated with the given node, and one or more recorded memory address ranges for one or more static portions of the authenticated code and static data in the memory associated with the given node.

2. The system of claim 1, wherein the RoT is to:
    record the one or more memory address ranges for the one or more static portions of the authenticated code and static data in the memory associated with the given node; and
    cause the given node to execute the authenticated code in response to the pushing to establish the trusted relationship between the RoT and the given node.

3. The system of claim 2,
    wherein the trusted server of the other node monitors a third node to ensure that the third node executes trusted operations and to ensure that authenticated code and static data in memory associated with the third node are unchanged, and
    wherein the monitoring by the trusted server of the other node of the given node comprises re-verifying an authenticity and an integrity of the one or more static portions of the authenticated code and static data for the given node.

4. The system of claim 3, wherein the trusted server of the other node severs the trusted relationship between the given node and the other node in response to a failure to re-verify the authenticity and the integrity of the one or more static portions of the authenticated code and data to separate the given node from the third node.

5. The system of claim 4, wherein the root trusted server of the RoT is further to:
    establish a trusted relationship between the trusted server of the RoT and third node; and
    monitor the third node to ensure that the third node executes trusted operations and to ensure that the authenticated code and static data in the memory associated with the third node are unchanged.

6. The system of claim 3, wherein the RoT is to generate the maintenance information for the given node.

7. The system of claim 3, wherein the monitoring by the trusted server of the given node of the other node comprises re-verifying the authenticity and the integrity of the one or more static portions of the authenticated code and corresponding static data for the other node.

8. The system of claim 7, wherein the trusted server of the given node severs the trusted relationship established between the given node and the other node in response to a failure to re-verify the authenticity and the integrity of the one or more static portions of the authenticated code and the corresponding static data for the other node.

9. The system of claim 2,
    wherein the trusted server of the other node monitors a third node to ensure that the third node executes trusted operations and to ensure that authenticated code and static data in memory associated with the third node are unchanged, and
    wherein the trusted server of the other node transfers the monitoring of the given node to ensure that the given node executes trusted operations and to ensure that the authenticated code and static data in the memory associated with the given node are unchanged to a trusted server of the third node.

10. The system of claim 9, wherein the monitoring by the trusted server of the third node of the given node comprises re-verifying the authenticity and the integrity of the one or more static portions of the authenticated code and static data for the given node, wherein the trusted server of the third node notifies the trusted server of the other node in response to a failure to re-verify the authenticity and the integrity of the one or more static portions of the authenticated code.

11. The system of claim 10, wherein the second node severs the trusted relationship between the given node and the other node in response to the failure to re-verify the authenticity and the integrity of the one or more static portions of the authenticated code by the third node.

12. The system of claim 1, wherein the given node is to one of periodically or asynchronously communicate over a digital interface with the other node to confirm an associated operational state of the other node prior to establishing the trusted relationship between the given node and the other node.

13. The system of claim 1, wherein the RoT is to communicate over a digital interface with one of the given node, the other node, and a combination thereof to receive status information for a respective node.

14. The system of claim 1, wherein at least one of the trusted server of the given node, the trusted server of the other node, and a combination thereof is implemented as a memory controller.

15. A method comprising:
- establishing and maintaining, by a root trusted server of a root of trust (RoT) a trusted relationship between the RoT and a first node of a plurality of nodes, wherein the root trusted server ensures that the first node executes trusted operations and ensures that authenticated code and static data in memory associated with the first node are unchanged;
- establishing and maintaining, by a trusted server of the first node, a trusted relationship between the first node and a second node of the plurality of nodes, wherein the trusted server of the first node ensures that the second node executes trusted operations and ensures that authenticated code and static data in memory associated with the second node are unchanged;
- receiving, at the second node, maintenance information, wherein the maintenance information includes one of a copy of a previously stored hash of the authenticated code and static data in the memory associated with the first node, and one or more recorded memory address ranges for one or more static portions of the authenticated code and static data in the memory associated with the second node; and
- maintaining, by a trusted server of the second node, the trusted relationship between the first node and the second node based on the received maintenance information to ensure that the first node executes trusted operations and ensure that the authenticated code and static data in the memory associated with the first node are unchanged.

16. The method of claim 15, wherein the maintaining comprises re-verifying, by the trusted server of the second node, the authenticity and the integrity of one or more static portions of the authenticated code and static data for the first node.

17. The method of claim 16, severing, by the trusted server of the second node, the trusted relationship between the first node and the second node in response to a failure to re-verify the authenticity and the integrity of the one or more static portions of the authenticated code for the first node.

18. The method of claim 16, wherein the maintaining, by the trusted server of the second node, the trusted relationship between the first node and the second node corresponds to monitoring, by a trusted server of a third node the first node to ensure that the first node executes trusted operations and to ensure that the authenticated code and static data in the memory associated with the first node are unchanged to maintain the trusted relationship between the first node and the second node.

19. A system for establishing and maintaining a bi-directional chain of trust comprising:
- a root of trust (RoT) executing a root trusted server that:
  - establishes a trusted relationship between the trusted server of the RoT and a first node; and
  - monitors the first node to ensure that the first node executes trusted operations and to ensure that authenticated code and static data in memory associated with the first node are unchanged;
- wherein the first node comprises a trusted server that:
  - establishes a trusted relationship between the trusted server of the first node and a second node and/or a third node; and
  - monitors the second node and the third node to ensure that the second node and the third node executes trusted operations and to ensure that respective authenticated code and static data in memory associated with the second node and the third node are unchanged; and
- wherein the second node comprises a trusted server that:
  - monitors the first node and the third node to ensure that the first node and the third node executes trusted operations and to ensure that the authenticated code and static data in memory associated with the first node and the third node are unchanged based on maintenance information received for the first node and maintenance information received for the third node, wherein the maintenance information includes one of a copy of a previously stored hash of the authenticated code and static data in the memory associated with the first node, and one or more recorded memory address ranges for one or more static portions of the authenticated code and static data in the memory associated with the second node; and
- wherein the third node comprises a trusted server that:
  - monitors the first node and the second node to ensure that the first node and the second node executes trusted operations and to ensure that the authenticated code and static data in memory associated with the first node and the second node are unchanged based on the maintenance information received for the first node and maintenance information received for the second node.

* * * * *